(12) United States Patent
Chen et al.

(10) Patent No.: US 12,216,249 B2
(45) Date of Patent: Feb. 4, 2025

(54) OPTICAL IMAGING LENS INCLUDING SIX LENSES OF +-+-+-OR +++-+-REFRACTIVE POWERS

(71) Applicant: ZHEJIANG SUNNY OPTICS CO., LTD., Zhejiang (CN)

(72) Inventors: Nian Chen, Zhejiang (CN); Kaiyuan Zhang, Zhejiang (CN); Xujiong Wu, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 747 days.

(21) Appl. No.: 17/145,423

(22) Filed: Jan. 11, 2021

(65) Prior Publication Data
US 2021/0294077 A1    Sep. 23, 2021

(30) Foreign Application Priority Data
Mar. 19, 2020   (CN) .......................... 202010195107.1

(51) Int. Cl.
*G02B 13/00*   (2006.01)
*G02B 9/62*    (2006.01)

(52) U.S. Cl.
CPC ........... *G02B 13/0045* (2013.01); *G02B 9/62* (2013.01)

(58) Field of Classification Search
CPC .............................. G02B 13/0045; G02B 9/62
See application file for complete search history.

(56) References Cited

U.S. PATENT DOCUMENTS 11,209,611 B2 * 12/2021 Oinuma ................. G02B 13/04
11,314,046 B2 *  4/2022 Ma ..................... G02B 13/0045
2019/0154964 A1 *  5/2019 Teraoka ............. G02B 13/0045
2020/0096734 A1 *  3/2020 Hsueh ................ G02B 13/0045
2020/0150391 A1 *  5/2020 Hsueh ...................... G02B 9/62
2021/0263272 A1 *  8/2021 Yamazaki .......... G02B 13/0045
2022/0146790 A1 *  5/2022 Zou ......................... G02B 13/18
2022/0206254 A1 *  6/2022 Wang ................. G02B 13/0045

FOREIGN PATENT DOCUMENTS

CN    110262017 A * 9/2019 ......... G02B 13/0045
CN    110333590 A * 10/2019 ......... G02B 13/0015

OTHER PUBLICATIONS

CN-110333590-A, translation (Year: 2019).*
CN-110262017-A, translation (Year: 2019).*

* cited by examiner

*Primary Examiner* — Wen Huang
(74) *Attorney, Agent, or Firm* — Samson G. Yu

(57) ABSTRACT

The disclosure discloses an optical imaging lens, which sequentially includes, from an object side to an image side along an optical axis: a first lens having positive refractive power; a second lens having refractive power; a third lens having refractive power; a fourth lens having negative refractive power, wherein an object-side surface thereof is a concave surface, while an image-side surface is a convex surface; a fifth lens having positive refractive power; and a sixth lens having negative refractive power, wherein an object-side surface thereof is a convex surface. TTL is a distance from an object-side surface of the first lens to an imaging surface of the optical imaging lens on the optical axis, ImgH is a half of a diagonal length of an effective pixel region on the imaging surface of the optical imaging lens, TTL and ImgH meet 4.0 mm<ImgH/(TTL/ImgH)<7.0 mm. Therefore, the optical imaging lens has high imaging quality.

7 Claims, 20 Drawing Sheets

OPTICAL IMAGING LENS INCLUDING SIX LENSES OF +-+-+-OR +++-+-REFRACTIVE POWERS

CROSS-REFERENCE TO RELATED DISCLOSURES

The disclosure claims priority to Chinese Patent Disclosure No. 202010195107.1, filed to the National Intellectual Property Administration, PRC (CNIPA) on Mar. 19, 2020, the disclosure of which is hereby incorporated by reference in its entirety.

TECHNICAL FIELD

The disclosure relates to the field of optical elements, and particularly to an optical imaging lens including six lenses.

BACKGROUND

In recent years, with the rapid development of intelligent terminals such as mobile phones, improvement of the photographing performance of mobile phones has increasingly become a direction of competition between manufacturers of mobile phones of each brand, and ultra-thin and ultra-high-definition mobile phones with ultra-large image surfaces have become increasingly hot. Generally, if a resolution of a camera module is higher, an image surface of an optical imaging lens is larger. A development trend of high-end camera phones is ultra-large image surface and ultra-high definition. At present, main camera modules of flagship phones of mainstream mobile phone brands have basically reached over 48 million pixels, and thus imaging lenses thereof mostly consist of six or seven lenses.

However, another development trend of high-end camera phones is ultra-thin design. Therefore, when a mobile phone is designed, it is necessary to achieve an ultra-thin design of a body and an ultra-thin structural design of a camera module, and there is also made a corresponding requirement on a height of the camera module.

SUMMARY

The disclosure provides an optical imaging lens, for example, an optical imaging lens having an ultra-large image surface and an ultra-thin characteristic, applied to a portable electronic product and capable of at least overcoming or partially overcoming at least one shortcoming in a related art.

An embodiment of the disclosure provides an optical imaging lens, which may sequentially include, from an object side to an image side along an optical axis: a first lens having positive refractive power; a second lens having refractive power; a third lens having refractive power; a fourth lens having negative refractive power, wherein an object-side surface thereof is a concave surface, while an image-side surface is a convex surface; a fifth lens having positive refractive power; and a sixth lens having negative refractive power, wherein an object-side surface thereof is a convex surface.

In an embodiment, TTL is a distance from an object-side surface of the first lens to an imaging surface of the optical imaging lens on the optical axis, ImgH is a half of a diagonal length of an effective pixel region on the imaging surface of the optical imaging lens, TTL and ImgH meet $4.0 \text{ mm} < \text{ImgH}/(\text{TTL/ImgH}) < 7.0 \text{ mm}$.

In an embodiment, TTL and ImgH meet $\text{TTL/ImgH} < 1.3$.

In an embodiment, a total effective focal length f of the optical imaging lens and a maximum semi-field of view (Semi-FOV) of the optical imaging lens may meet $5.0 \text{ mm} < f \times \tan(\text{Semi-FOV}) < 7.0 \text{ mm}$.

In an embodiment, an effective focal length f1 of the first lens and an effective focal length f5 of the fifth lens may meet $0.7 < f1/f5 < 1.2$.

In an embodiment, an effective focal length f4 of the fourth lens, an effective focal length f6 of the sixth lens and a total effective focal length f of the optical imaging lens may meet $0.6 < (f6-f4)/f < 2.0$.

In an embodiment, a curvature radius R7 of the object-side surface of the fourth lens and a curvature radius R8 of the image-side surface of the fourth lens may meet $0.1 < R7/R8 < 0.7$.

In an embodiment, a center thickness CT5 of the fifth lens on the optical axis, a center thickness CT6 of the sixth lens on the optical axis and an air space T56 of the fifth lens and the sixth lens on the optical axis may meet $0.7 < (CT5+CT6)/T56 < 1.5$.

In an embodiment, an effective focal length f3 of the third lens and a curvature radius R6 of an image-side surface of the third lens may meet $-2.7 < f3/R6 < -1.6$.

In an embodiment, a maximum effective radius DT11 of the object-side surface of the first lens, a maximum effective radius DT12 of an image-side surface of the first lens and a maximum effective radius DT62 of an image-side surface of the sixth lens may meet $1.3 < DT62/(DT11+DT12) < 1.7$.

In an embodiment, the center thickness CT5 of the fifth lens on the optical axis and an edge thickness ET5 of the fifth lens may meet $1.6 < CT5/ET5 < 2.4$.

In an embodiment, an on-axis distance SAG41 from an intersection point of the object-side surface of the fourth lens and the optical axis to an effective radius vertex of the object-side surface of the fourth lens, an on-axis distance SAG42 from an intersection point of the image-side surface of the fourth lens and the optical axis to an effective radius vertex of the image-side surface of the fourth lens, an on-axis distance SAG51 from an intersection point of an object-side surface of the fifth lens and the optical axis to an effective radius vertex of the object-side surface of the fifth lens and an on-axis distance SAG52 from an intersection point of an image-side surface of the fifth lens and the optical axis to an effective radius vertex of the image-side surface of the fifth lens may meet $0.5 < (SAG41+SAG42)/(SAG51+SAG52) < 0.9$.

In an embodiment, an on-axis distance SAG32 from an intersection point of an image-side surface of the third lens and the optical axis to an effective radius vertex of the image-side surface of the third lens and an on-axis distance SAG62 from an intersection point of an image-side surface of the sixth lens and the optical axis to an effective radius vertex of the image-side surface of the sixth lens may meet $1.5 < SAG62/SAG32 < 3.4$.

In an embodiment, a combined focal length f123 of the first lens, the second lens and the third lens and the total effective focal length f of a optical imaging lens may meet $0.7 < f123/f < 1.0$.

According to the optical imaging lens provided in the disclosure, multiple lenses are adopted, for example, the first lens to the sixth lens. A relationship between an image height and optical total length of the optical imaging lens is reasonably controlled, and the refractive power and surface type of each lens are optimized, so that the characteristics of ultra-large image surface, ultra-thin design, low sensitivity, high imaging quality and the like of the optical imaging lens may be achieved, meanwhile, each lens is compact in structure and high in formability and manufacturability, and the yield of a camera module may be improved. In addition, high infinite-distance imaging performance of the optical imaging lens according to the disclosure may be achieved, and meanwhile, high finite-distance imaging performance is ensured.

BRIEF DESCRIPTION OF THE DRAWINGS

Detailed descriptions are made to unrestrictive embodiments below in combination with the drawings to make the other characteristics, purposes and advantages of the disclosure more apparent. In the drawings.

DETAILED DESCRIPTION OF THE EMBODIMENTS

Figure 1:
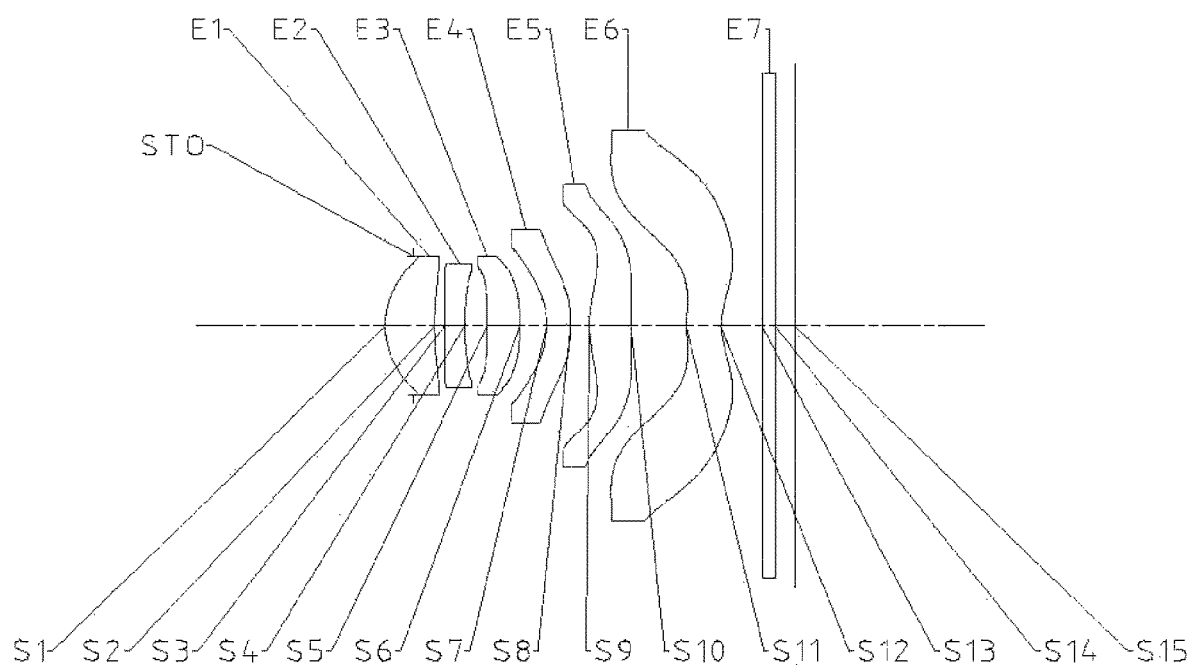
FIG. 1 shows a structure diagram of an optical imaging lens according to embodiment 1 of the disclosure.

For understanding the disclosure better, more detailed descriptions will be made to each aspect of the disclosure with reference to the drawings. It is to be understood that these detailed descriptions are only descriptions about the exemplary embodiments of the disclosure and not intended to limit the scope of the disclosure in any manner. In the whole specification, the same reference sign numbers represent the same components. Expression "and/or" includes any or all combinations of one or more in associated items that are listed.

It is to be noted that, in the specification, expressions like first, second and third are adopted not to represent any limit to characteristics but only to distinguish one characteristic from another characteristic. Therefore, a first lens discussed below may also be called a second lens or a third lens under the condition of not departing from the teachings of the disclosure.

In the drawings, the thickness, size and shape of the lens have been slightly exaggerated for ease illustration. In particular, a spherical shape or an aspherical shape shown in the drawings is shown by some embodiments. That is, the spherical shape or the aspherical shape is not limited to the spherical shape or the aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if the lens surface is a concave surface and a position of the concave surface is not defined, it indicates that the lens surface is a concave surface at least in the paraxial region. A surface of each lens closest to an object-side is called an object-side surface of the lens, and a surface of each lens closest to an imaging surface is called an image-side surface of the lens.

It is also to be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the embodiments of the disclosure are described, "may" is used to represent "one or more embodiments of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It should be noted that the embodiments in the disclosure and features in the embodiments can be combined without conflicts. The disclosure will be described below with reference to the drawings and in combination with the embodiments in detail.

The features, principles and other aspects of the disclosure will be described below in detail.

An optical imaging lens according to an exemplary embodiment of the disclosure may include six lenses with refractive power, i.e., a first lens, a second lens, a third lens, a fourth lens, a fifth lens and a sixth lens. The six lenses are sequentially arranged from an object side to an image side along an optical axis. In the first lens to the sixth lens, there may be an air space between every two adjacent lenses.

In the exemplary embodiment, the first lens may have positive refractive power; the second lens may have positive refractive power or negative refractive power; the third lens may have positive refractive power or negative refractive power; the fourth lens may have negative refractive power, an object-side surface thereof may be a concave surface, while an image-side surface may be a convex surface; the fifth lens has positive refractive power; and the sixth lens may have negative refractive power, and an object-side surface thereof may be a convex surface. The refractive power and surface type of each lens in an optical system are reasonably matched to ensure the structural reasonability of the optical imaging lens, so that an ultra-high-definition photographic function of a camera module may be realized, a primary aberration of the optical imaging lens may be corrected better, and the tolerance sensitivity of the optical system may be reduced.

In the exemplary embodiment, an object-side surface of the first lens may be a convex surface, while an image-side surface may be a concave surface.

In the exemplary embodiment, an image-side surface of the second lens may be a concave surface.

In the exemplary embodiment, an object-side surface of the fifth lens may be a convex surface.

In the exemplary embodiment, an image-side surface of the sixth lens may be a concave surface.

In the exemplary embodiment, TTL is a distance from the object-side surface of the first lens to an imaging surface of the optical imaging lens on the optical axis, ImgH is a half of a diagonal length of an effective pixel region on the imaging surface of the optical imaging lens, TTL and ImgH meet 4.0 mm<ImgH/(TTL/ImgH)<7.0 mm, for example, 4.0 mm<ImgH/(TTL/ImgH)<5.0 mm. An interrelation between the distance from the object-side surface of the first lens to the imaging surface of the optical imaging lens on the optical axis and a half of the diagonal length of the effective pixel region on the imaging surface of the optical imaging lens may be reasonably controlled to ensure an ultra-large image surface and ultra-thin characteristic of the optical imaging lens.

In the exemplary embodiment, TTL is a distance from the object-side surface of the first lens to an imaging surface of the optical imaging lens on the optical axis, ImgH is a half of a diagonal length of an effective pixel region on the imaging surface of the optical imaging lens, TTL and ImgH meet TTL/ImgH<1.3, for example, 1.2<TTL/ImgH<1.3. A ratio of the distance from the object-side surface of the first lens to the imaging surface of the optical imaging lens on the optical axis to a half of the diagonal length of the effective pixel region on the imaging surface of the optical imaging lens may be controlled in a reasonable numerical range to ensure the performance of ultra-large image surface of the imaging lens and simultaneously reduce a total length of the optical system thereof to achieve an ultra-thin structure, with the ultra-large image surface, of the optical imaging lens.

In the exemplary embodiment, a total effective focal length f of the optical imaging lens and a maximum semi-field of view (Semi-FOV) of the optical imaging lens may meet 5.0 mm<f×tan(Semi-FOV)<7.0 mm, for example, 5.0 mm<f×tan(Semi-FOV)<6.0 mm. An interrelation between the total effective focal length of the optical imaging lens and the maximum semi-field of view of the optical imaging lens may be reasonably controlled to ensure the structure, with the ultra-large image surface, of the optical system and facilitate realization of the ultra-high-definition photographic function of the optical imaging lens.

In the exemplary embodiment, an effective focal length f1 of the first lens and an effective focal length f5 of the fifth lens may meet 0.7<f1/f5<1.2. Controlling a ratio of the effective focal length of the first lens to the effective focal length of the fifth lens in a reasonable numerical range is favorable for implementing reasonable configuration of the refractive power of the first lens and the fifth lens and reducing an aberration of the optical imaging lens.

In the exemplary embodiment, an effective focal length f4 of the fourth lens, an effective focal length f6 of the sixth lens and the total effective focal length f of the optical imaging lens may meet 0.6<(f6−f4)/f<2.0, for example, 0.6<(f6−f4)/f<1.7. Reasonably controlling an interrelation of the effective focal length of the fourth lens, the effective focal length of the sixth lens and the total effective focal length of the optical imaging lens is favorable for spatial reasonable distribution of the refractive power of the fourth lens and the sixth lens and reduction of the aberration of the optical imaging lens.

In the exemplary embodiment, a curvature radius R7 of the object-side surface of the fourth lens and a curvature radius R8 of the image-side surface of the fourth lens may meet 0.1<R7/R8<0.7, for example, 0.4<R7/R8<0.7. Controlling a ratio of the curvature radii of the object-side surface and the image-side surface of the fourth lens in a reasonable numerical range is favorable for reasonably regulating a contribution of the fourth lens to the aberration of the optical imaging lens.

In the exemplary embodiment, a center thickness CT5 of the fifth lens on the optical axis, a center thickness CT6 of the sixth lens on the optical axis and an air space T56 of the fifth lens and the sixth lens on the optical axis may meet 0.7<(CT5+CT6)/T56<1.5. Reasonably controlling an interrelation of the center thicknesses of the fifth lens and the sixth lens and the air space of the fifth lens and the sixth lens on the optical axis is favorable for avoiding the influence of excessively large thicknesses of the lenses on a spatial distribution thereof in the system and facilitates assembling of the optical imaging lens.

In the exemplary embodiment, an effective focal length f3 of the third lens and a curvature radius R6 of an image-side surface of the third lens may meet −2.7<f3/R6<−1.6. Controlling a ratio of the effective focal length of the third lens to the curvature radius of the image-side surface of the third lens in a reasonable numerical range is favorable for forming and manufacturing the third lens. In the exemplary embodiment, the third lens may have positive refractive power, and the image-side surface thereof may be a convex surface.

In the exemplary embodiment, a maximum effective radius DT11 of the object-side surface of the first lens, a maximum effective radius DT12 of the image-side surface of the first lens and a maximum effective radius DT62 of the image-side surface of the sixth lens may meet 1.3<DT62/(DT11+DT12)<1.7. An interrelation of the maximum effective radii of the object-side surface and the image-side surface of the first lens and the maximum effective radius of the image-side surface of the sixth lens may be reasonably controlled to avoid the influence of excessively large effective radii of the lenses on the spatial distribution of the lenses and facilitate assembling of the optical imaging lens.

In the exemplary embodiment, the center thickness CT5 of the fifth lens on the optical axis and an edge thickness ET5 of the fifth lens may meet 1.6<CT5/ET5<2.4. Controlling a ratio of the center thickness to edge thickness of the fifth lens on the optical axis in a reasonable numerical range is favorable for forming and manufacturing the fifth lens.

In the exemplary embodiment, an on-axis distance SAG41 from an intersection point of the object-side surface of the fourth lens and the optical axis to an effective radius vertex of the object-side surface of the fourth lens, an on-axis distance SAG42 from an intersection point of the image-side surface of the fourth lens and the optical axis to an effective radius vertex of the image-side surface of the fourth lens, an on-axis distance SAG51 from an intersection point of the object-side surface of the fifth lens and the optical axis to an effective radius vertex of the object-side surface of the fifth lens and an on-axis distance SAG52 from an intersection point of an image-side surface of the fifth lens and the optical axis to an effective radius vertex of the image-side surface of the fifth lens may meet 0.5<(SAG41+SAG42)/(SAG51+SAG52)<0.9. Reasonably controlling an interrelation of rises of the object-side surface and the image-side surface of the fourth lens and rises of the object-side surface and the image-side surface of the fifth lens is favorable for restricting bending degrees of the fourth lens and the fifth lens and reducing difficulties in forming and manufacturing of the fourth lens and the fifth lens.

In the exemplary embodiment, an on-axis distance SAG32 from an intersection point of the image-side surface of the third lens and the optical axis to an effective radius vertex of the image-side surface of the third lens and an on-axis distance SAG62 from an intersection point of the image-side surface of the sixth lens and the optical axis to an effective radius vertex of the image-side surface of the sixth lens may meet 1.5<SAG62/SAG32<3.4. Controlling a ratio of rises of the image-side surface of the sixth lens and the image-side surface of the third lens in a reasonable numerical range is favorable for restricting bending degrees of the third lens and the sixth lens and reducing difficulties in forming and manufacturing of the third lens and the sixth lens.

In the exemplary embodiment, a combined focal length f123 of the first lens, the second lens and the third lens and the total effective focal length f of the optical imaging lens may meet 0.7<f123/f<1.0. Reasonably controlling a proportional relationship between the combined focal length of the first lens, the second lens and the third lens and the total effective focal length of the optical imaging lens is favorable for reasonably distributing the refractive power of the first lens, the second lens and the third lens in a system space and reducing the aberration of the optical imaging lens.

In the exemplary embodiment, the optical imaging lens may further include a diaphragm. The diaphragm may be arranged at a proper position as required. For example, the diaphragm may be arranged between the object side and the first lens. Optionally, the optical imaging lens may further include an optical filter configured to correct a chromatic aberration and/or protective glass configured to protect a photosensitive element on the imaging surface.

The disclosure discloses an optical imaging lens having the characteristics of ultra-large image surface, ultra-thin design and the like. The optical imaging lens according to the embodiment of the disclosure may adopt multiple lenses, for example, the abovementioned six lenses. The refractive power of each lens, a surface type, a center thickness of each lens, on-axis distances between the lenses and the like may be reasonably configured to effectively converge incident light, reduce the optical total length of the imaging lens, improve the manufacturability of the imaging lens and ensure that the optical imaging lens is more favorable for production and manufacturing.

In the exemplary embodiment, at least one of mirror surfaces of each lens is an aspherical mirror surface, namely at least one mirror surface in the object-side surface of the first lens to the image-side surface of the sixth lens is an aspherical mirror surface. An aspherical lens has a characteristic that a curvature keeps changing from a center of the lens to a periphery of the lens. Unlike a spherical lens having a constant curvature from a center of the lens to a periphery of the lens, the aspherical lens has a better curvature radius characteristic and the advantages of improving distortions and improving astigmatic aberrations. With adoption of the aspherical lens, the astigmatic aberrations during imaging may be eliminated as much as possible, thereby improving the imaging quality. Optionally, at least one of the object-side surface and the image-side surface of each lens in the first lens, the second lens, the third lens, the fourth lens, the fifth lens and the sixth lens is an aspherical mirror surface. Optionally, both the object-side surface and the image-side surface of each lens in the first lens, the second lens, the third lens, the fourth lens, the fifth lens and the sixth lens are aspherical mirror surfaces.

The disclosure also provides an imaging device, of which an electronic photosensitive element may be a Charge-Coupled Device (CCD) or a Complementary Metal Oxide Semiconductor (CMOS). The imaging device may be an independent imaging device such as a digital camera, and may also be an imaging module integrated into a mobile electronic device such as a mobile phone. The imaging device is provided with the abovementioned optical imaging lens.

However, those skilled in the art should know that the number of the lenses forming the optical imaging lens may be changed without departing from the technical solutions claimed in the disclosure to achieve each result and advantage described in the specification. For example, although descriptions are made in the implementation with six lenses as an example, the optical imaging lens is not limited to six lenses. If necessary, the optical imaging lens may further include another number of lenses.

Specific embodiments of the optical imaging lens applied to the abovementioned embodiment will further be described below with reference to the drawings.

Embodiment 1

An optical imaging lens according to embodiment 1 of the disclosure will be described below with reference to FIG. 1 to FIG. 2D. FIG. 1 shows a structure diagram of an optical imaging lens according to embodiment 1 of the disclosure.

As shown in FIG. 1, the optical imaging lens sequentially includes, from an object side to an image side along an optical axis, a diaphragm STO, a first lens E1, a second lens E2, a third lens E3, a fourth lens E4, a fifth lens E5, a sixth lens E6, an optical filter E7 and an imaging surface S15.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has positive refractive power, an object-side surface S5 thereof is a concave surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a convex surface, while an image-side surface S10 is a concave surface. The sixth lens E6 has negative refractive power, an object-side surface S11 thereof is a convex surface, while an image-side surface S12 is a concave surface. The optical filter E7 has an object-side surface S13 and an image-side surface S14. Light from an object sequentially penetrates through each of the surfaces S1 to S14 and is finally imaged on the imaging surface S15.

Table 1 is a basic parameter table of the optical imaging lens of embodiment 1, and units of the curvature radius, the thickness and the focal length are all millimeter (mm).

TABLE 1

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.4451 | | | | |
| S1 | Aspherical | 2.0834 | 0.7857 | 1.55 | 56.1 | 5.17 | 0.0000 |
| S2 | Aspherical | 6.9125 | 0.1546 | | | | 0.0000 |
| S3 | Aspherical | 16.0594 | 0.3200 | 1.68 | 19.2 | −14.64 | 0.0000 |
| S4 | Aspherical | 6.0822 | 0.3555 | | | | 0.0000 |
| S5 | Aspherical | −147.0474 | 0.5200 | 1.57 | 37.3 | 11.11 | 0.0000 |
| S6 | Aspherical | −6.0814 | 0.4247 | | | | 0.0000 |
| S7 | Aspherical | −2.2964 | 0.3800 | 1.67 | 20.4 | −8.76 | 0.0000 |
| S8 | Aspherical | −4.0383 | 0.3121 | | | | 0.0000 |
| S9 | Aspherical | 3.4618 | 0.6658 | 1.55 | 56.1 | 6.40 | 0.0000 |
| S10 | Aspherical | 376.7872 | 0.8777 | | | | 0.0000 |
| S11 | Aspherical | 6.2525 | 0.5478 | 1.55 | 56.1 | −5.05 | 0.0000 |
| S12 | Aspherical | 1.8554 | 0.6524 | | | | −0.9704 |
| S13 | Spherical | Infinite | 0.2100 | 1.52 | 64.2 | | |
| S14 | Spherical | Infinite | 0.3140 | | | | |
| S15 | Spherical | Infinite | | | | | |

In the embodiment, a total effective focal length of the optical imaging lens is f=5.55 mm, TTL is a distance from the object-side surface S1 of the first lens E1 to the imaging surface S15 on the optical axis, TTL=6.52 mm, and ImgH is a half of a diagonal length of an effective pixel region on the imaging surface S15, ImgH=5.29 mm.

In embodiment 1, both the object-side surface and the image-side surface of any lens in the first lens E1 to the sixth lens E6 are aspherical surfaces, and a surface type of each aspherical lens may be defined through, but not limited to, the following aspherical surface formula:

$$x = \frac{ch^2}{1+\sqrt{1-(k+1)c^2h^2}} + \sum A_i h^i, \quad (1)$$

wherein, x is the distance vector height from a vertex of the aspherical surface when the aspherical surface is at a height of h along the optical axis direction; c is a paraxial curvature of the aspherical surface, c=1/R (namely, the paraxial curvature c is a reciprocal of the curvature radius R in Table 1); k is the conic coefficient; and Ai is an ith-order correction coefficient of the aspherical surface. Table 2 shows high-order coefficients $A_4$, $A_6$, $A_8$, $A_{10}$, $A_{12}$, $A_{14}$, $A_{16}$, $A_{18}$ and $A_{20}$ applied to the aspherical mirror surfaces S1-S12 in embodiment 1.

TABLE 2

| Surface number | A4 | A6 | A8 | A10 | A12 |
|---|---|---|---|---|---|
| S1 | 5.7683E−03 | −3.6755E−02 | 2.1360E−01 | −7.5613E−01 | 1.7743E+00 |
| S2 | −2.7663E−02 | 2.0779E−02 | −7.0017E−02 | 2.1817E−01 | −4.1664E−01 |
| S3 | 4.4408E−02 | −2.6205E−02 | 3.8534E−01 | −1.5779E+00 | 4.1503E+00 |
| S4 | −3.3917E−02 | 8.7111E−02 | −3.2831E−01 | 1.1062E+00 | −2.2786E+00 |
| S5 | −4.2340E−02 | −5.3996E−02 | 2.2875E−01 | −8.3317E−01 | 2.1236E+00 |
| S6 | −3.1010E−02 | −5.1976E−02 | 1.1522E−01 | −2.0009E−01 | 2.0173E−01 |
| S7 | 1.5746E−02 | −7.9373E−02 | 7.9983E−03 | 4.5250E−01 | −1.2119E+00 |
| S8 | −1.1024E−02 | −1.3189E−01 | 2.6536E−01 | −3.0773E−01 | 2.5924E−01 |
| S9 | −6.9883E−03 | −1.0888E−01 | 1.4524E−01 | −1.2404E−01 | 7.3948E−02 |
| S10 | 3.3717E−02 | −7.3109E−02 | 5.6026E−02 | −2.9014E−02 | 1.0147E−02 |
| S11 | −1.3521E−01 | −2.4065E−03 | 2.5997E−02 | −1.3223E−02 | 3.8425E−03 |
| S12 | −1.5450E−01 | 4.7899E−02 | −1.1729E−02 | 2.3092E−03 | −3.4491E−04 |

| Surface number | A14 | A16 | A18 | A20 |
|---|---|---|---|---|
| S1 | −2.8487E+00 | 3.1730E+00 | −2.4469E+00 | 1.2798E+00 |
| S2 | 4.6512E−01 | −2.5122E−01 | −3.4188E−02 | 1.4517E−01 |
| S3 | −7.3563E+00 | 8.9345E+00 | −7.4473E+00 | 4.1884E+00 |
| S4 | 2.7384E+00 | 1.4673E+00 | −6.3920E−01 | 1.6390E+00 |
| S5 | −3.8546E+00 | 4.9461E+00 | −4.4362E+00 | 2.7152E+00 |
| S6 | −3.9252E−02 | −1.8634E−01 | 2.7537E−01 | −1.9277E−01 |
| S7 | 1.7583E+00 | −1.6383E+00 | 1.0190E+00 | −4.2133E−01 |
| S8 | −1.6011E−01 | 7.1408E−02 | −2.2595E−02 | 4.9338E−03 |
| S9 | −3.1171E−02 | 9.2829E−03 | −1.9366E−03 | 2.7617E−04 |
| S10 | −2.1845E−03 | 2.1581E−04 | 1.4887E−05 | −7.2165E−06 |
| S11 | −7.3819E−04 | 9.7400E−05 | −8.8876E−06 | 5.5224E−07 |
| S12 | 3.5095E−05 | −2.0268E−06 | 1.8741E−08 | 6.1275E−09 |

Figure 2A:
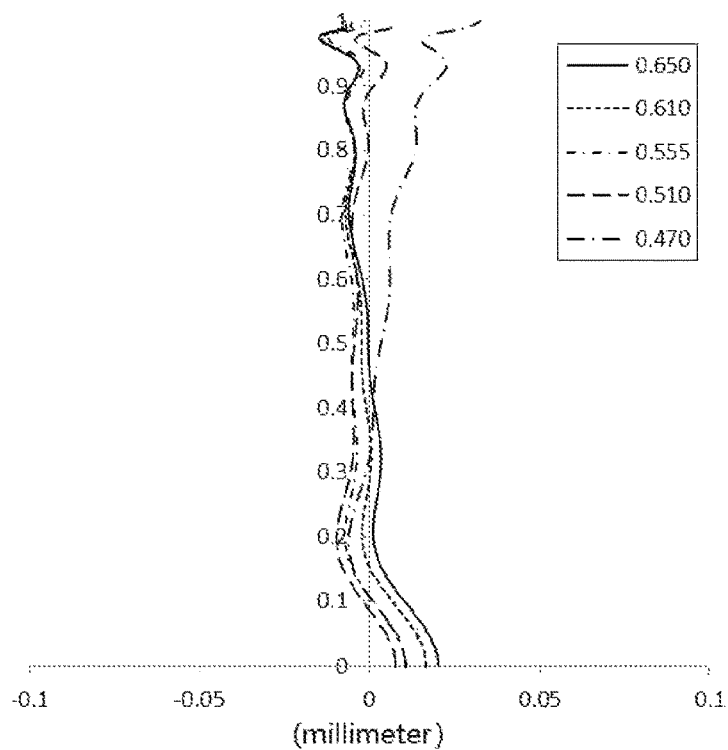
FIG. 2A to FIG. 2D show a longitudinal aberration curve, an astigmatism curve, a distortion curve and a lateral color curve of an optical imaging lens according to embodiment 1 respectively.
Figure 2B:
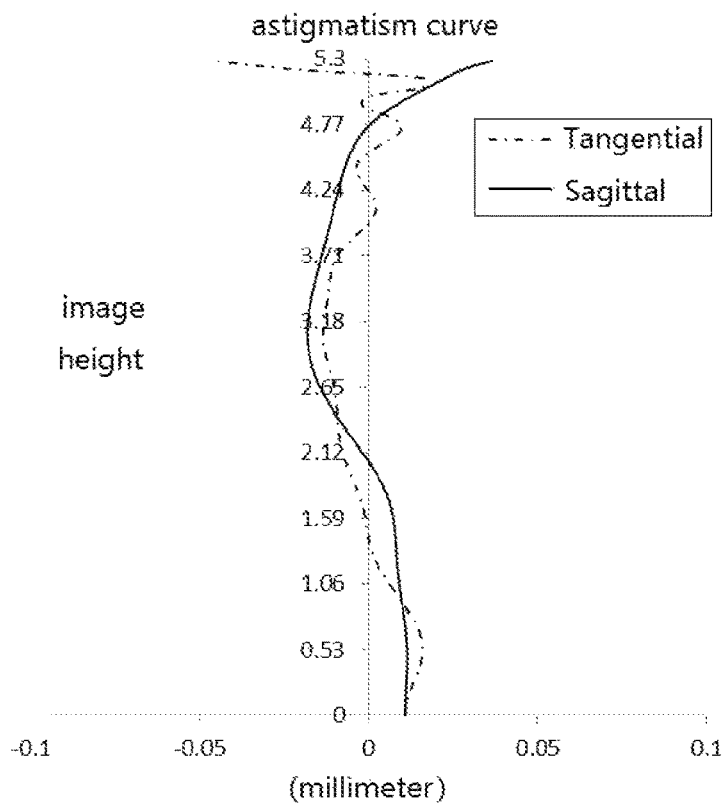
Figure 2C:
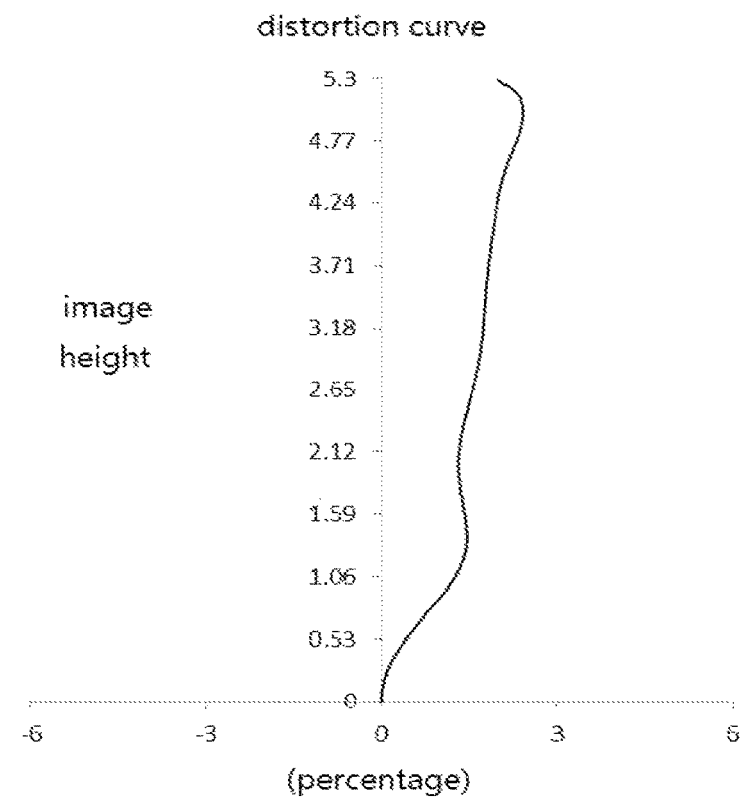
Figure 2D:
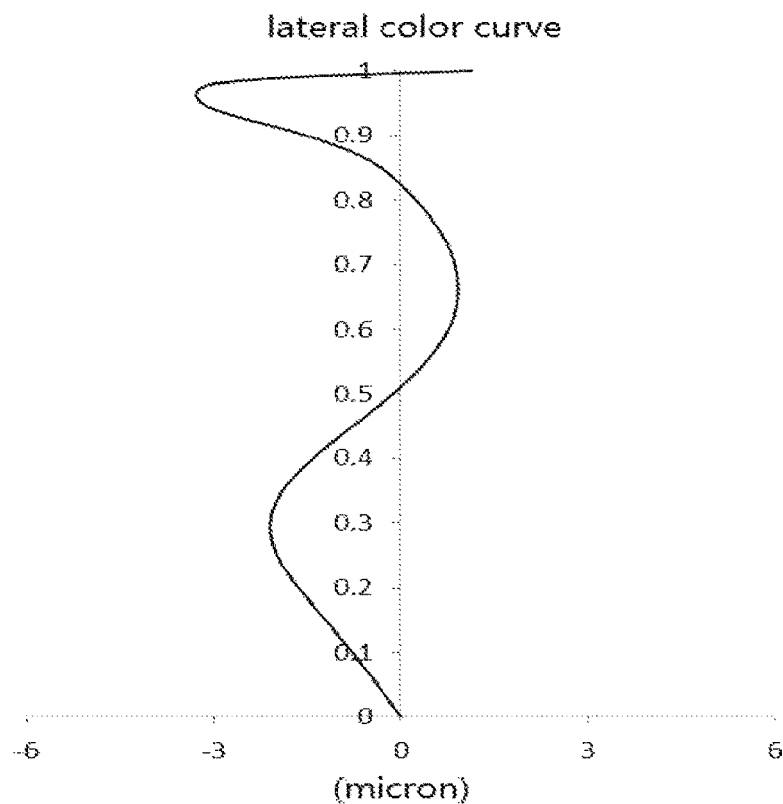

FIG. 2A shows a longitudinal aberration curve of the optical imaging lens according to embodiment 1 to represent deviation of a convergence focal point after light with different wavelengths passes through the lens. FIG. 2B shows an astigmatism curve of the optical imaging lens according to embodiment 1 to represent a meridian image surface curvature and a sagittal image surface curvature. FIG. 2C shows a distortion curve of the optical imaging lens according to embodiment 1 to represent distortion values corresponding to different image heights. FIG. 2D shows a lateral color curve of the optical imaging lens according to embodiment 1 to represent deviation of different image heights on the imaging surface after the light passes through the lens. According to FIG. 2A to FIG. 2D, it can be seen that the optical imaging lens provided in embodiment 1 may achieve high imaging quality.

Embodiment 2

Figure 3:
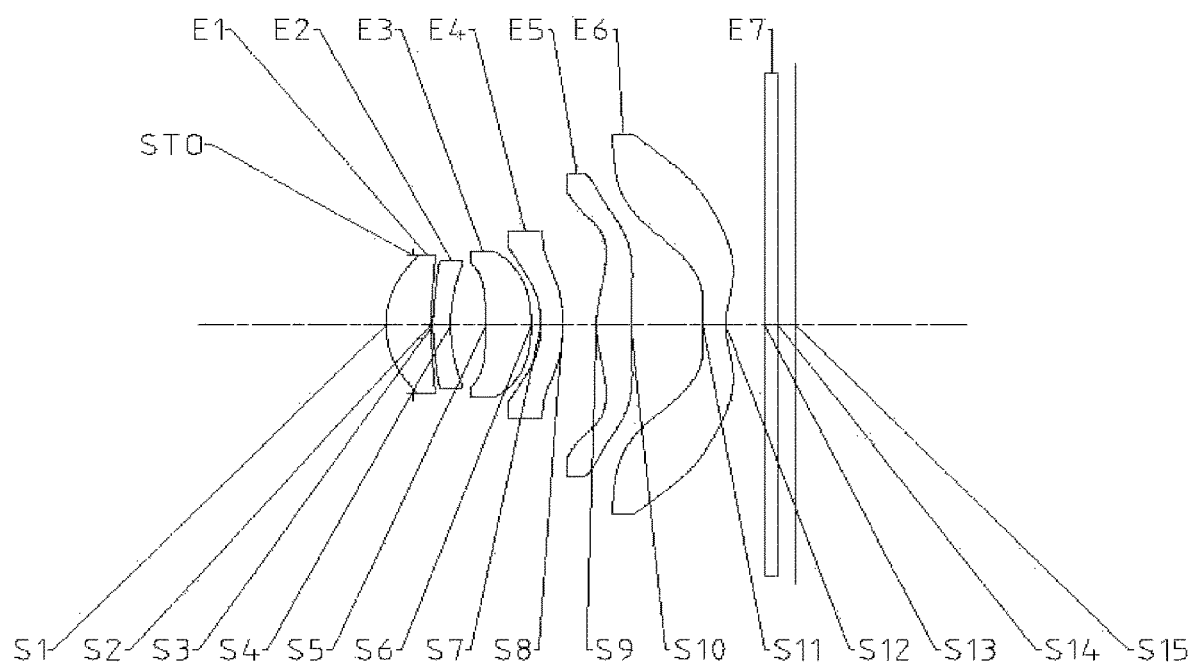
FIG. 3 shows a structure diagram of an optical imaging lens according to embodiment 2 of the disclosure.

An optical imaging lens according to embodiment 2 of the disclosure will be described below with reference to FIG. 3 to FIG. 4D. FIG. 3 shows a structure diagram of an optical imaging lens according to embodiment 2 of the disclosure.

As shown in FIG. 3, the optical imaging lens sequentially includes, from an object side to an image side along an optical axis, a diaphragm STO, a first lens E1, a second lens E2, a third lens E3, a fourth lens E4, a fifth lens E5, a sixth lens E6, an optical filter E7 and an imaging surface S15.

The first lens E1 has positive refractive power, an object-side surface S1 thereof is a convex surface, while an image-side surface S2 is a concave surface. The second lens E2 has positive refractive power, an object-side surface S3 thereof is a convex surface, while an image-side surface S4 is a concave surface. The third lens E3 has positive refractive power, an object-side surface S5 thereof is a concave surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a convex surface, while an image-side surface S10 is a concave surface. The sixth lens E6 has negative refractive power, an object-side surface S11 thereof is a convex surface, while an image-side surface S12 is a concave surface. The optical filter E7 has an object-side surface S13 and an image-side surface S14. Light from an object sequentially penetrates through each of the surfaces S1 to S14 and is finally imaged on the imaging surface S15.

In the embodiment, a total effective focal length of the optical imaging lens is f=5.55 mm, TTL is a distance from the object-side surface S1 of the first lens E1 to the imaging surface S15 on the optical axis, TTL=6.52 mm, and ImgH is a half of a diagonal length of an effective pixel region on the imaging surface S15, ImgH=5.16 mm.

Table 3 is a basic parameter table of the optical imaging lens of embodiment 2, and units of the curvature radius, the thickness and the focal length are all millimeter (mm).

TABLE 3

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| STO | Spherical | Infinite | −0.4249 | | | | |
| S1 | Aspherical | 2.2063 | 0.7052 | 1.55 | 56.1 | 7.14 | 0.0000 |
| S2 | Aspherical | 4.5104 | 0.0400 | | | | 0.0000 |
| S3 | Aspherical | 3.7327 | 0.2800 | 1.68 | 19.2 | 95.49 | 0.0000 |
| S4 | Aspherical | 3.8412 | 0.5596 | | | | 0.0000 |
| S5 | Aspherical | −10.4840 | 0.7199 | 1.57 | 37.3 | 10.42 | 0.0000 |
| S6 | Aspherical | −3.8874 | 0.1541 | | | | 0.0000 |
| S7 | Aspherical | −2.7104 | 0.3467 | 1.67 | 20.4 | −8.62 | 0.0000 |
| S8 | Aspherical | −5.3874 | 0.5442 | | | | 0.0000 |
| S9 | Aspherical | 3.0058 | 0.5479 | 1.55 | 56.1 | 6.71 | 0.0000 |
| S10 | Aspherical | 15.7137 | 1.1425 | | | | 0.0000 |
| S11 | Aspherical | 10.0391 | 0.3600 | 1.55 | 56.1 | −4.43 | 0.0000 |
| S12 | Aspherical | 1.9242 | 0.6242 | | | | −0.9154 |
| S13 | Spherical | Infinite | 0.2100 | 1.52 | 64.2 | | |
| S14 | Spherical | Infinite | 0.2854 | | | | |
| S15 | Spherical | Infinite | | | | | |

In embodiment 2, both the object-side surface and the image-side surface of any lens in the first lens E1 to the sixth lens E6 are aspherical surfaces. Table 4 shows high-order coefficients $A_4$, $A_6$, $A_8$, $A_{10}$, $A_{12}$, $A_{14}$, $A_{16}$, $A_{18}$ and $A_{20}$ applied to the aspherical mirror surfaces S1-S12 in embodiment 2.

TABLE 4

| Surface number | A4 | A6 | A8 | A10 | A12 | A14 | A16 | A18 | A20 |
|---|---|---|---|---|---|---|---|---|---|
| S1 | −1.0448E−03 | 3.6215E−02 | −1.5664E−01 | 4.0621E−01 | −5.9584E−01 | 3.9928E−01 | 1.3666E−01 | −5.1385E−01 | 4.5967E−01 |
| S2 | −1.4836E−01 | 3.1241E−01 | −1.3273E+00 | 5.0094E+00 | −1.2607E+01 | 2.1283E+01 | −2.4575E+01 | 1.9462E+01 | −1.0389E+01 |
| S3 | −1.4046E−01 | 1.6132E−01 | 5.2969E−01 | 2.3159E+00 | −6.5620E+00 | 1.2146E+01 | −1.5216E+01 | 1.3016E+01 | −7.4844E+00 |
| S4 | −1.6210E−02 | −1.2326E−01 | 9.4588E−01 | −4.0752E+00 | 1.1938E+01 | −2.4270E+01 | 3.4467E+01 | −3.4034E+01 | 2.2878E+01 |
| S5 | −2.8394E−02 | 2.8832E−02 | 3.5350E−01 | 1.6149E+00 | −4.6726E+00 | 8.9945E+00 | −1.1842E+01 | 1.0687E+01 | −6.4801E+00 |
| S6 | −3.2585E−02 | −5.2959E−02 | 1.0238E−01 | −1.1330E−01 | 8.1008E−02 | −4.7994E−02 | 6.5691E−03 | 2.1342E−02 | −1.3723E−02 |
| S7 | −5.9476E−02 | −8.6059E−02 | 4.7165E−01 | −1.1464E+00 | 2.0449E+00 | −2.6450E+00 | 2.3834E+00 | −1.4653E+00 | 6.0258E−01 |

TABLE 4-continued

| Surface number | A4 | A6 | A8 | A10 | A12 | A14 | A16 | A18 | A20 |
|---|---|---|---|---|---|---|---|---|---|
| S8 | −8.7656E−02 | 6.1877E−03 | 1.1395E−01 | −1.8101E−01 | 1.8281E−01 | 1.3721E−01 | 7.6791E−02 | −3.0849E−02 | 8.4744E−03 |
| S9 | −3.7819E−02 | −4.5545E−02 | 6.6165E−02 | −5.6727E−02 | 3.3657E−02 | −1.4181E−02 | 4.2296E−03 | −8.8416E−04 | 1.2651E−04 |
| S10 | 2.0938E−02 | −6.4296E−02 | 5.8381E−02 | −3.8016E−02 | 1.8028E−02 | −6.0756E−03 | 1.4271E−03 | −2.2985E−04 | 2.4785E−05 |
| S11 | −1.9941E−01 | 5.9387E−02 | −1.0307E−02 | 9.2888E−04 | 1.9216E−04 | −1.0289E−04 | 2.1630E−05 | −2.6931E−06 | 2.1204E−07 |
| S12 | −2.1190E−01 | 9.6808E−02 | −3.8422E−02 | 1.2184E−02 | −2.8861E−03 | 4.9823E−04 | −6.2074E−05 | 5.5077E−06 | −3.3895E−07 |

Figure 4A:
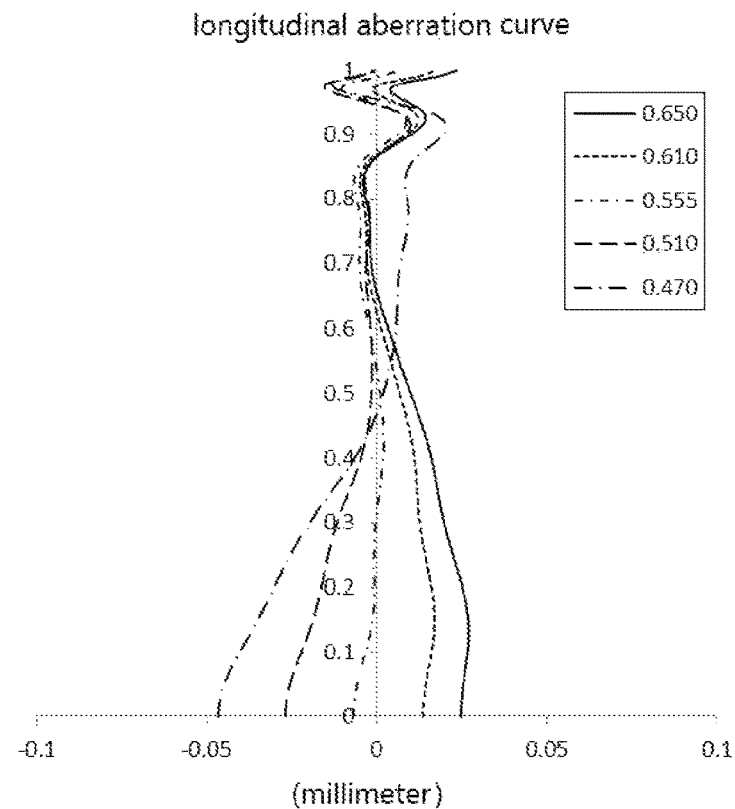
FIG. 4A to FIG. 4D show a longitudinal aberration curve, an astigmatism curve, a distortion curve and a lateral color curve of an optical imaging lens according to embodiment 2 respectively.
Figure 4B:
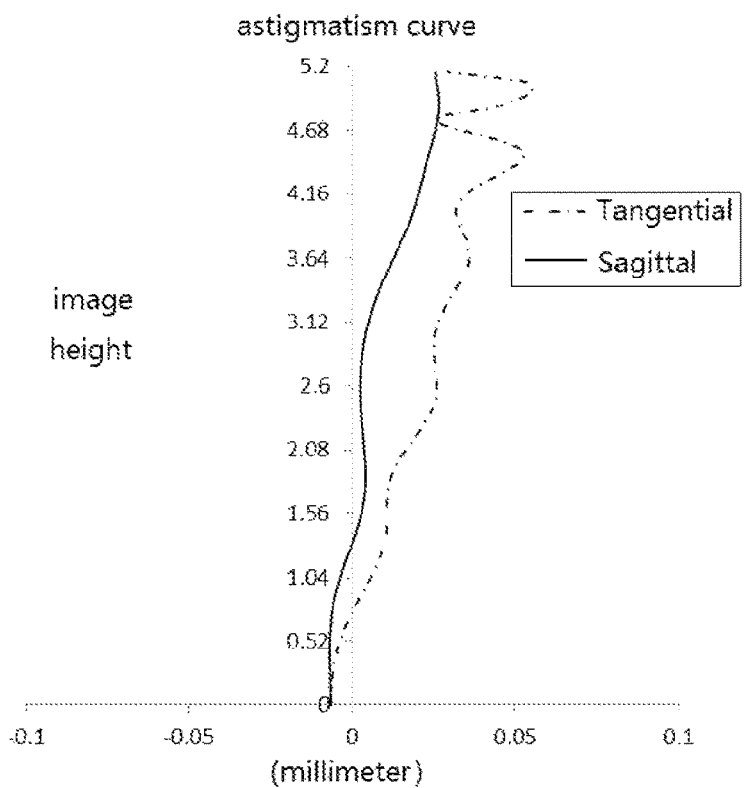
Figure 4C:
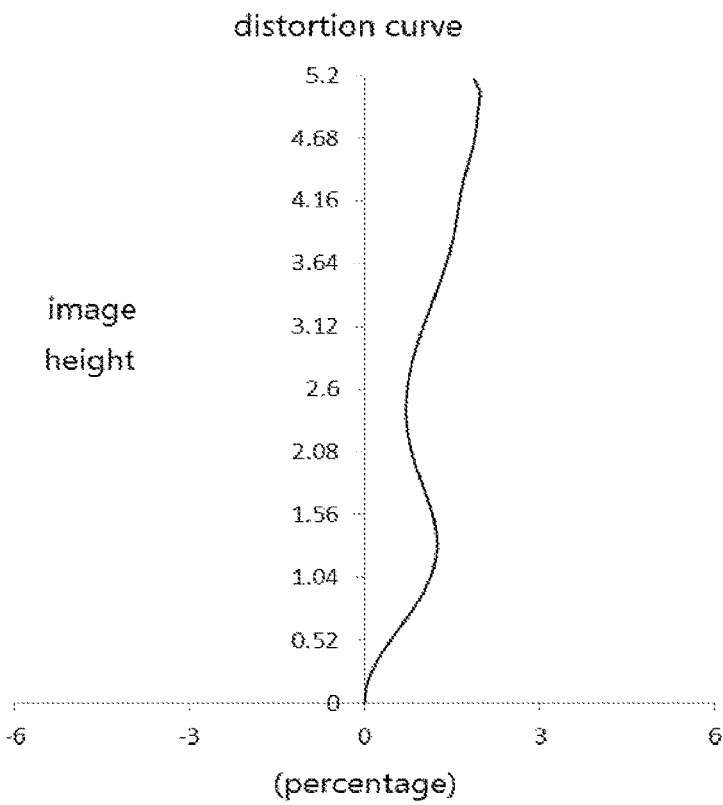
Figure 4D:
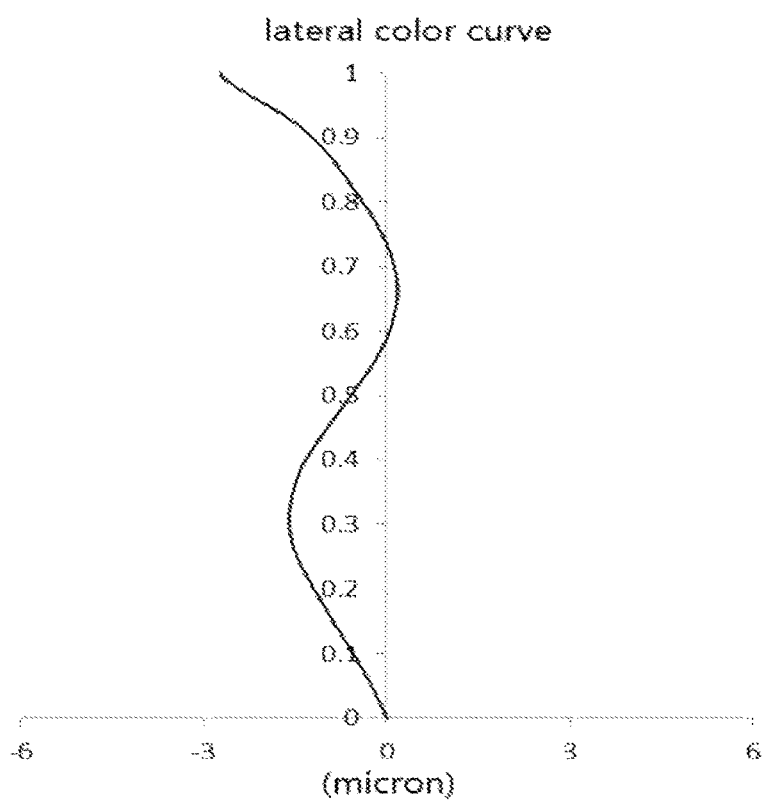

FIG. 4A shows a longitudinal aberration curve of the optical imaging lens according to embodiment 2 to represent deviation of a convergence focal point after light with different wavelengths passes through the lens. FIG. 4B shows an astigmatism curve of the optical imaging lens according to embodiment 2 to represent a meridian image surface curvature and a sagittal image surface curvature. FIG. 4C shows a distortion curve of the optical imaging lens according to embodiment 2 to represent distortion values corresponding to different image heights. FIG. 4D shows a lateral color curve of the optical imaging lens according to embodiment 2 to represent deviation of different image heights on the imaging surface after the light passes through the lens. According to FIG. 4A to FIG. 4D, it can be seen that the optical imaging lens provided in embodiment 2 may achieve high imaging quality.

Embodiment 3

Figure 5:
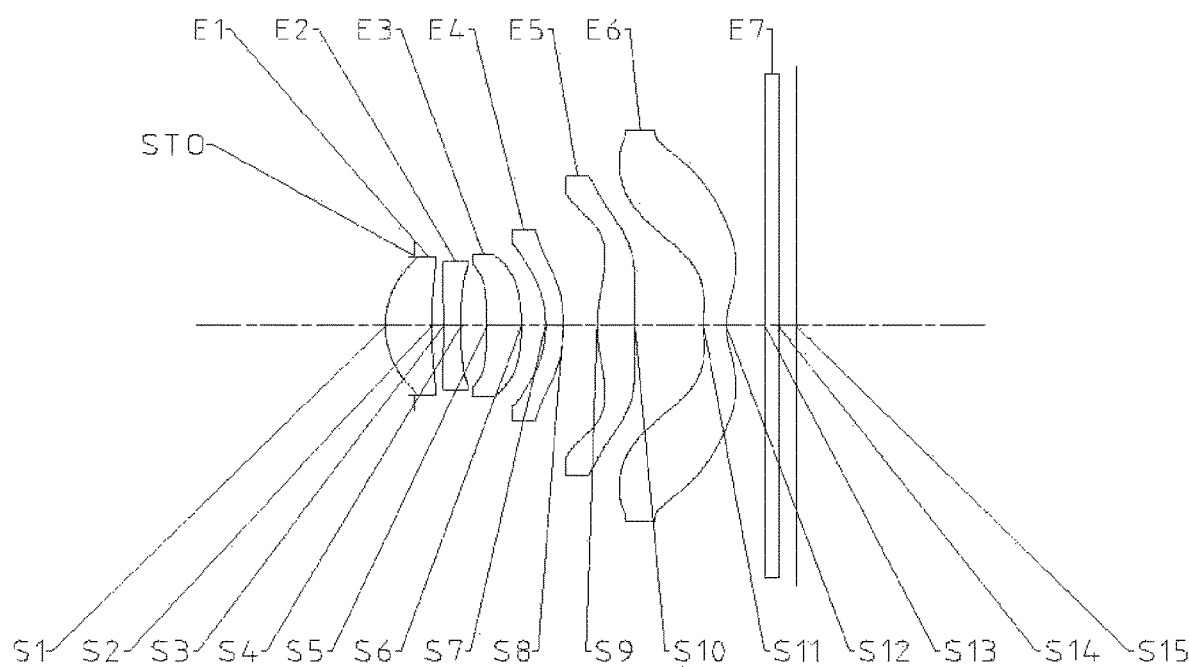
FIG. 5 shows a structure diagram of an optical imaging lens according to embodiment 3 of the disclosure.

An optical imaging lens according to embodiment 3 of the disclosure will be described below with reference to FIG. 5 to FIG. 6D. FIG. 5 shows a structure diagram of an optical imaging lens according to embodiment 3 of the disclosure.

As shown in FIG. 5, the optical imaging lens sequentially includes, from an object side to an image side along an optical axis, a diaphragm STO, a first lens E1, a second lens E2, a third lens E3, a fourth lens E4, a fifth lens E5, a sixth lens E6, an optical filter E7 and an imaging surface S15.

The first lens E1 has positive refractive power, an object-side surface S1 thereof is a convex surface, while an image-side surface S2 is a concave surface. The second lens E2 has negative refractive power, an object-side surface S3 thereof is a concave surface, while an image-side surface S4 is a concave surface. The third lens E3 has positive refractive power, an object-side surface S5 thereof is a concave surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a convex surface, while an image-side surface S10 is a concave surface. The sixth lens E6 has negative refractive power, an object-side surface S11 thereof is a convex surface, while an image-side surface S12 is a concave surface. The optical filter E7 has an object-side surface S13 and an image-side surface S14. Light from an object sequentially penetrates through each of the surfaces S1 to S14 and is finally imaged on the imaging surface S15.

In the embodiment, a total effective focal length of the optical imaging lens is f=5.58 mm, TTL is a distance from the object-side surface S1 of the first lens E1 to the imaging surface S15 on the optical axis, TTL=6.52 mm, and ImgH is a half of a diagonal length of an effective pixel region on the imaging surface S15, ImgH=5.24 mm.

Table 5 is a basic parameter table of the optical imaging lens of embodiment 3, and units of the curvature radius, the thickness and the focal length are all millimeter (mm).

TABLE 5

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.4585 | | | | |
| S1 | Aspherical | 2.1226 | 0.7317 | 1.55 | 56.1 | 4.96 | 0.0000 |
| S2 | Aspherical | 8.6474 | 0.1871 | | | | 0.0000 |
| S3 | Aspherical | −88.9200 | 0.2800 | 1.68 | 19.2 | −12.16 | 0.0000 |
| S4 | Aspherical | 9.0935 | 0.4085 | | | | 0.0000 |
| S5 | Aspherical | −23.1344 | 0.5496 | 1.57 | 37.3 | 13.86 | 0.0000 |
| S6 | Aspherical | −5.9444 | 0.3815 | | | | 0.0000 |
| S7 | Aspherical | −3.5376 | 0.2800 | 1.67 | 20.4 | −13.51 | 0.0000 |
| S8 | Aspherical | −6.0083 | 0.5486 | | | | 0.0000 |
| S9 | Aspherical | 3.5118 | 0.5998 | 1.55 | 56.1 | 6.83 | 0.0000 |
| S10 | Aspherical | 56.7816 | 1.0881 | | | | 0.0000 |
| S11 | Aspherical | 7.1159 | 0.3600 | 1.55 | 56.1 | −4.55 | 0.0000 |
| S12 | Aspherical | 1.8077 | 0.6172 | | | | −0.9329 |
| S13 | Spherical | Infinite | 0.2100 | 1.52 | 64.2 | | |
| S14 | Spherical | Infinite | 0.2784 | | | | |
| S15 | Spherical | Infinite | | | | | |

In embodiment 3, both the object-side surface and the image-side surface of any lens in the first lens E1 to the sixth lens E6 are aspherical surfaces. Table 6 shows high-order coefficients $A_4$, $A_6$, $A_8$, $A_{10}$, $A_{12}$, $A_{14}$, $A_{16}$, $A_{18}$ and $A_{20}$ applied to the aspherical mirror surfaces S1-S12 in embodiment 3.

TABLE 6

| Surface number | A4 | A6 | A8 | A10 | A12 | A14 | A16 | A18 | A20 |
|---|---|---|---|---|---|---|---|---|---|
| S1 | −1.4428E−03 | 3.9129E−02 | −2.0207E−01 | 6.7827E−01 | −1.4961E+00 | 2.2332E+00 | −2.2884E+00 | 1.6092E+00 | −7.6260E−01 |
| S2 | −1.7562E−02 | 2.0713E−02 | −1.0328E−01 | 4.0003E−01 | −9.9126E−01 | 1.6284E+00 | −1.8209E+00 | 1.3932E+00 | −7.1819E−01 |
| S3 | −3.4207E−02 | 5.8365E−02 | −1.7948E−01 | 6.4325E−01 | −1.5328E+00 | 2.4411E+00 | −2.6755E+00 | 2.0399E+00 | −1.0694E+00 |
| S4 | −1.6417E−02 | −1.9992E−03 | 2.5825E−01 | −1.2777E+00 | 3.9649E+00 | −8.2426E+00 | 1.1697E+01 | −1.1339E+01 | 7.3698E+00 |
| S5 | 6.5129E−02 | 1.2462E−01 | −9.3109E−01 | 3.9893E+00 | −1.1390E+01 | 2.2318E+01 | −3.0498E+01 | 2.8997E+01 | −1.8746E+01 |
| S6 | −5.4502E−02 | 2.9209E−02 | −2.1571E−01 | 8.0783E−01 | −1.9387E+00 | 3.1017E+00 | −3.3872E+00 | 2.5350E+00 | −1.2786E+00 |
| S7 | −8.5395E−02 | 2.3370E−02 | 5.8308E−02 | −9.5985E−02 | 8.6759E−02 | −5.3696E−02 | 2.6496E−02 | −1.2015E−02 | 4.8603E−03 |
| S8 | −9.9299E−02 | 1.7290E−02 | 9.1475E−02 | −1.6356E−01 | 1.7425E−01 | −1.2769E−01 | 6.5684E−02 | −2.3521E−02 | 5.6775E−03 |
| S9 | −3.2050E−02 | 3.9720E−02 | 5.6817E−02 | −4.8904E−02 | 2.9190E−02 | −1.2317E−02 | 3.6600E−03 | −7.5777E−04 | 1.0663E−04 |
| S10 | 1.8440E−02 | −5.2971E−02 | 4.4031E−02 | −2.6624E−02 | 1.1788E−02 | −3.7074E−03 | 8.1164E−04 | −1.2158E−04 | 1.2154E−05 |
| S11 | −1.7925E−01 | 4.2621E−02 | −4.1765E−03 | −1.2605E−04 | 1.3270E−04 | −3.0109E−05 | 4.2849E−06 | −4.1005E−07 | 2.6200E−08 |
| S12 | −1.9055E−01 | 7.6428E−02 | −2.6132E−02 | 7.0491E−03 | −1.4063E−03 | 2.0238E−04 | −2.0820E−05 | 1.5124E−06 | −7.5614E−08 |

Figure 6A:
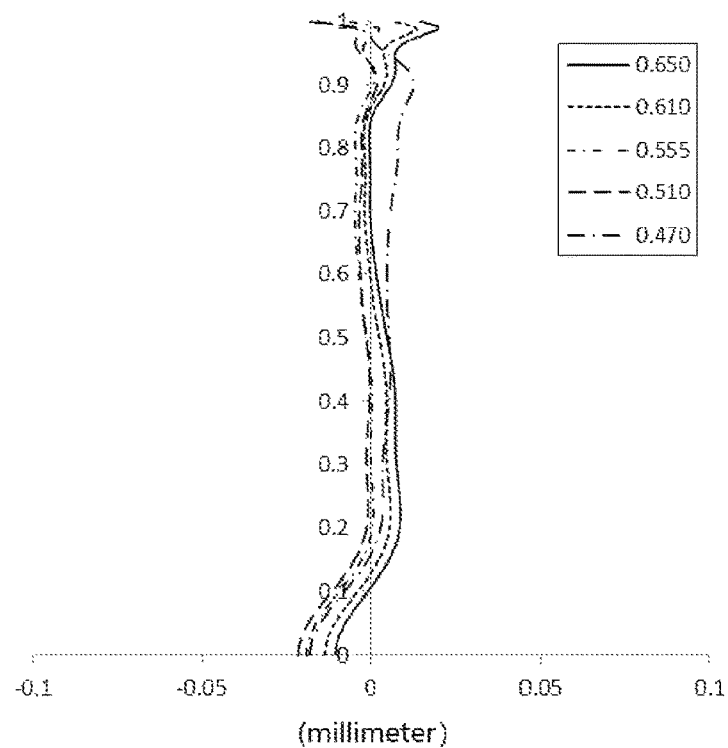
FIG. 6A to FIG. 6D show a longitudinal aberration curve, an astigmatism curve, a distortion curve and a lateral color curve of an optical imaging lens according to embodiment 3 respectively.
Figure 6B:
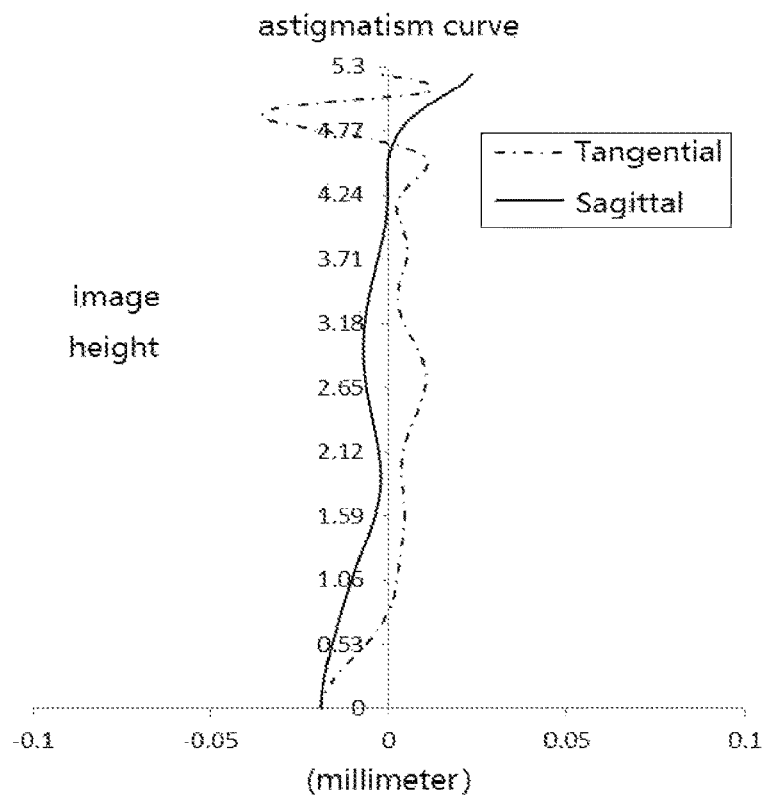
Figure 6C:
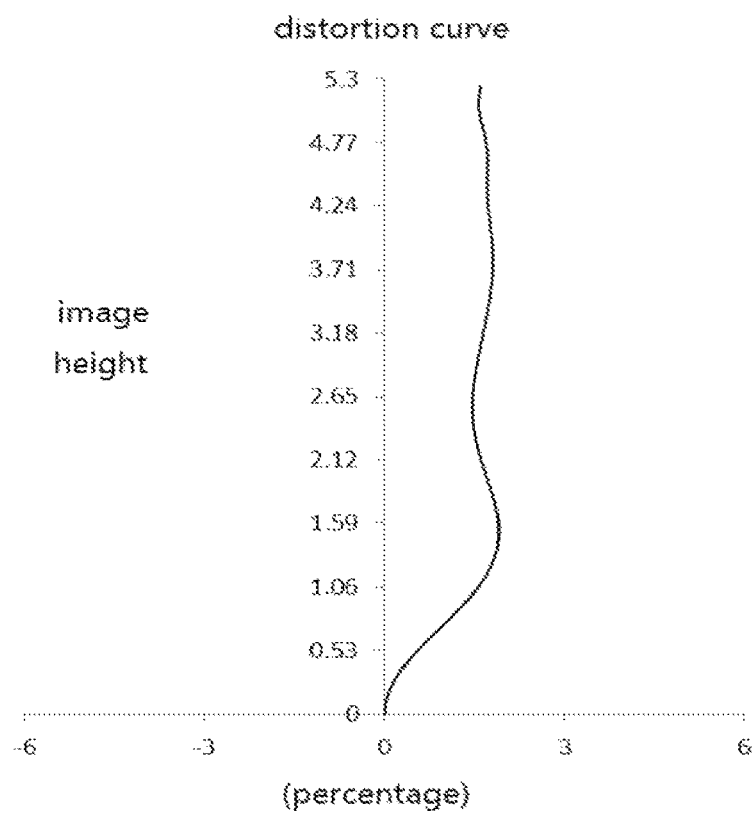
Figure 6D:
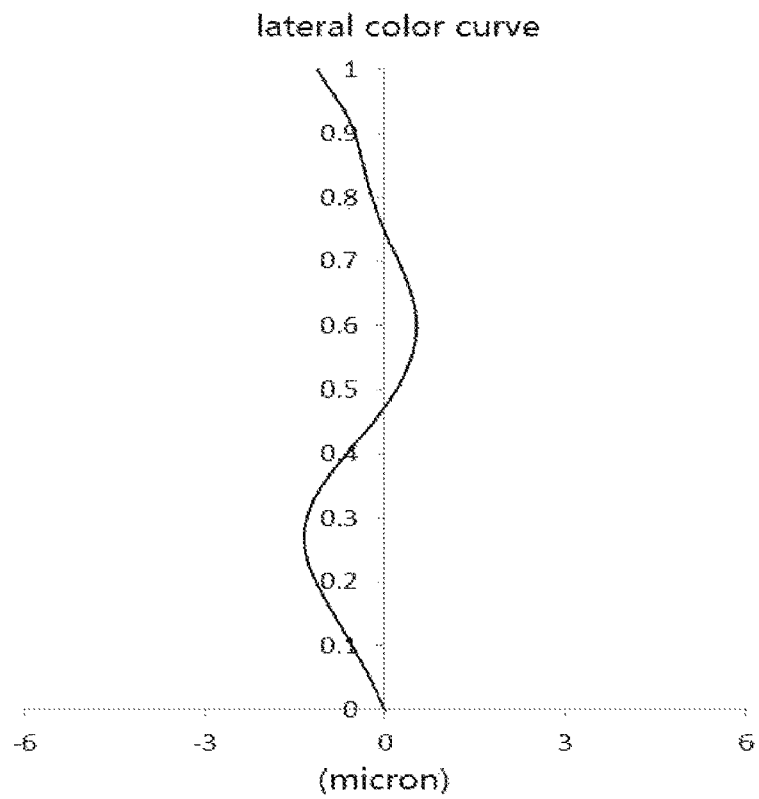

FIG. 6A shows a longitudinal aberration curve of the optical imaging lens according to embodiment 3 to represent deviation of a convergence focal point after light with different wavelengths passes through the lens. FIG. 6B shows an astigmatism curve of the optical imaging lens according to embodiment 3 to represent a meridian image surface curvature and a sagittal image surface curvature. FIG. 6C shows a distortion curve of the optical imaging lens according to embodiment 3 to represent distortion values corresponding to different image heights. FIG. 6D shows a lateral color curve of the optical imaging lens according to embodiment 3 to represent deviation of different image heights on the imaging surface after the light passes through the lens. According to FIG. 6A to FIG. 6D, it can be seen that the optical imaging lens provided in embodiment 3 may achieve high imaging quality.

Embodiment 4

Figure 7:
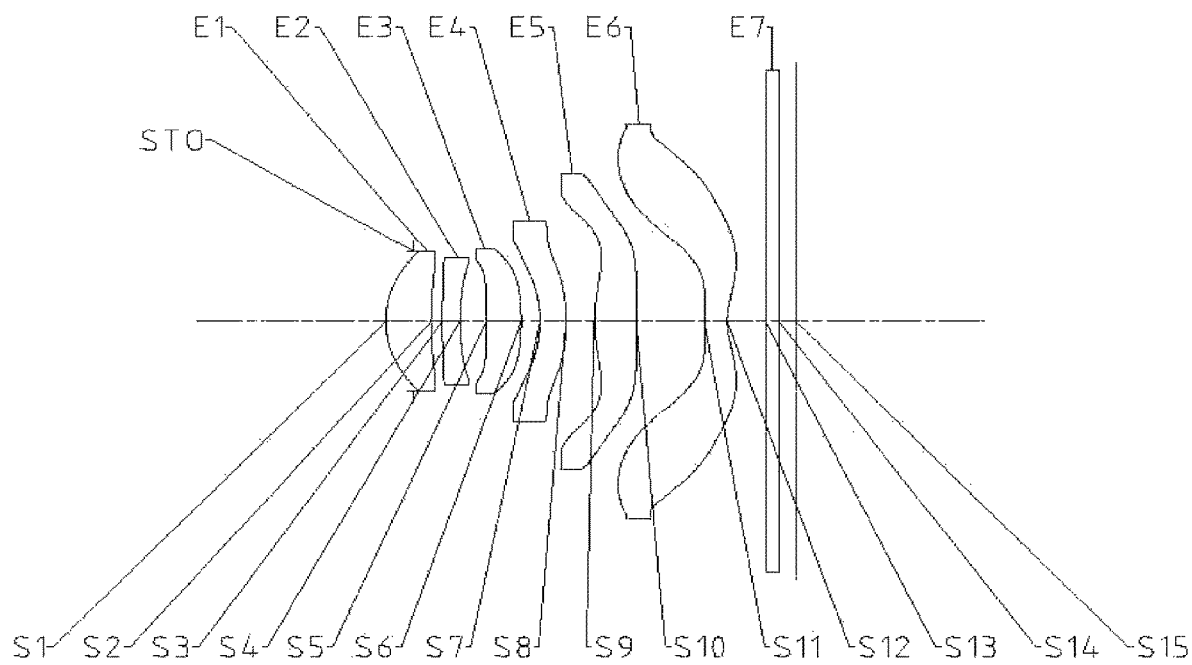
FIG. 7 shows a structure diagram of an optical imaging lens according to embodiment 4 of the disclosure.

An optical imaging lens according to embodiment 4 of the disclosure will be described below with reference to FIG. 7 to FIG. 8D. FIG. 7 shows a structure diagram of an optical imaging lens according to embodiment 4 of the disclosure.

As shown in FIG. 7, the optical imaging lens sequentially includes, from an object side to an image side along an optical axis, a diaphragm STO, a first lens E1, a second lens E2, a third lens E3, a fourth lens E4, a fifth lens E5, a sixth lens E6, an optical filter E7 and an imaging surface S15.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has positive refractive power, an object-side surface S5 thereof is a convex surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a convex surface, while an image-side surface S10 is a concave surface. The sixth lens E6 has negative refractive power, an object-side surface S11 thereof is a convex surface, while an image-side surface S12 is a concave surface. The optical filter E7 has an object-side surface S13 and an image-side surface S14. Light from an object sequentially penetrates through each of the surfaces S1 to S14 and is finally imaged on the imaging surface S15.

In the embodiment, a total effective focal length of the optical imaging lens is f=5.57 mm, TTL is a distance from the object-side surface S1 of the first lens E1 to the imaging surface S15 on the optical axis, TTL=6.52 mm, and ImgH is a half of a diagonal length of an effective pixel region on the imaging surface S15, ImgH=5.20 mm.

Table 7 is a basic parameter table of the optical imaging lens of embodiment 4, and units of the curvature radius, the thickness and the focal length are all millimeter (mm).

TABLE 7

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.4394 | | | | |
| S1 | Aspherical | 2.1289 | 0.7202 | 1.55 | 56.1 | 5.06 | 0.0000 |
| S2 | Aspherical | 8.1555 | 0.1767 | | | | 0.0000 |
| S3 | Aspherical | 14.7253 | 0.2800 | 1.68 | 19.2 | −12.49 | 0.0000 |
| S4 | Aspherical | 5.3320 | 0.4153 | | | | 0.0000 |
| S5 | Aspherical | 72.2600 | 0.5542 | 1.57 | 37.3 | 10.86 | 0.0000 |
| S6 | Aspherical | −6.7587 | 0.3004 | | | | 0.0000 |
| S7 | Aspherical | −3.1276 | 0.4143 | 1.67 | 20.4 | −11.07 | 0.0000 |
| S8 | Aspherical | −5.7120 | 0.4592 | | | | 0.0000 |
| S9 | Aspherical | 3.6093 | 0.6595 | 1.55 | 56.1 | 7.08 | 0.0000 |
| S10 | Aspherical | 51.4337 | 1.0834 | | | | 0.0000 |
| S11 | Aspherical | 7.0647 | 0.3604 | 1.55 | 56.1 | −4.61 | 0.0000 |
| S12 | Aspherical | 1.8212 | 0.6128 | | | | −0.9308 |
| S13 | Spherical | Infinite | 0.2100 | 1.52 | 64.2 | | |
| S14 | Spherical | Infinite | 0.2740 | | | | |
| S15 | Spherical | Infinite | | | | | |

In embodiment 4, both the object-side surface and the image-side surface of any lens in the first lens E1 to the sixth lens E6 are aspherical surfaces. Table 8 shows high-order coefficients $A_4$, $A_6$, $A_8$, $A_{10}$, $A_{12}$, $A_{14}$, $A_{16}$, $A_{18}$ and $A_{20}$ applied to the aspherical mirror surfaces S1-S12 in embodiment 4.

E2, a third lens E3, a fourth lens E4, a fifth lens E5, a sixth lens E6, an optical filter E7 and an imaging surface S15.

The first lens E1 has positive refractive power, an object-side surface S1 thereof is a convex surface, while an image-side surface S2 is a concave surface. The second lens E2 has negative refractive power, an object-side surface S3

TABLE 8

| Surface number | A4 | A6 | A8 | A10 | A12 | A14 | A16 | A18 | A20 |
|---|---|---|---|---|---|---|---|---|---|
| S1 | −2.0313E−03 | 3.7389E−02 | −1.8768E−01 | 5.9999E−01 | −1.2469E+00 | 1.7301E+00 | −1.6217E+00 | 1.0223E+00 | −4.2295E−01 |
| S2 | −2.4398E−02 | 4.2112E−02 | −2.0503E−01 | 7.3734E−01 | −1.7201E+00 | 2.6775E+00 | −2.8360E+00 | 2.0460E+00 | −9.8686E−01 |
| S3 | −4.9238E−02 | 7.3589E−02 | −2.7720E−01 | 1.1198E+00 | −2.9523E+00 | 5.1736E+00 | −6.1794E+00 | 5.0595E+00 | −2.7961E+00 |
| S4 | −2.5784E−02 | 2.7626E−03 | 2.4184E−01 | −1.2665E+00 | 4.2121E+00 | −9.3784E+00 | 1.4205E+01 | −1.4664E+01 | 1.0152E+01 |
| S5 | −5.1806E−02 | 1.2522E−01 | −9.3158E−01 | 3.8488E+00 | −1.0539E+01 | 1.9734E+01 | −2.5723E+01 | 2.3334E+01 | −1.4450E+01 |
| S6 | −3.8019E−02 | −9.6491E−04 | −1.0701E−01 | 3.9915E−01 | −8.9833E−01 | 1.3255E+00 | −1.3390E+00 | 9.3811E−01 | −4.4870E−01 |
| S7 | −2.4002E−02 | −4.7756E−02 | 2.0675E−01 | −4.4784E−01 | 6.9761E−01 | −7.9583E−01 | 6.5336E−01 | −3.7465E−01 | 1.4506E−01 |
| S8 | −5.5935E−02 | −5.6549E−03 | 7.4236E−02 | −9.9100E−02 | 8.2311E−02 | −4.7888E−02 | 2.0305E−02 | −6.2767E−03 | 1.3676E−03 |
| S9 | −4.0878E−02 | −3.2406E−02 | 5.2151E−02 | −4.9379E−02 | 3.2740E−02 | −1.5557E−02 | 5.2477E−03 | −1.2375E−03 | 1.9841E−04 |
| S10 | 1.0147E−02 | −4.3333E−02 | 3.5785E−02 | −2.1734E−02 | 9.7893E−03 | −3.1650E−03 | 7.1484E−04 | −1.1002E−04 | 1.1191E−05 |
| S11 | −1.8882E−01 | 5.0804E−02 | −9.0593E−03 | 1.8410E−03 | −3.9184E−04 | 6.4481E−05 | −7.4674E−06 | 5.9940E−07 | −3.2753E−08 |
| S12 | −1.9793E−01 | 8.3245E−02 | −3.0306E−02 | 8.6910E−03 | −1.8373E−03 | 2.8024E−04 | −3.0623E−05 | 2.3692E−06 | −1.2648E−07 |

Figure 8A:
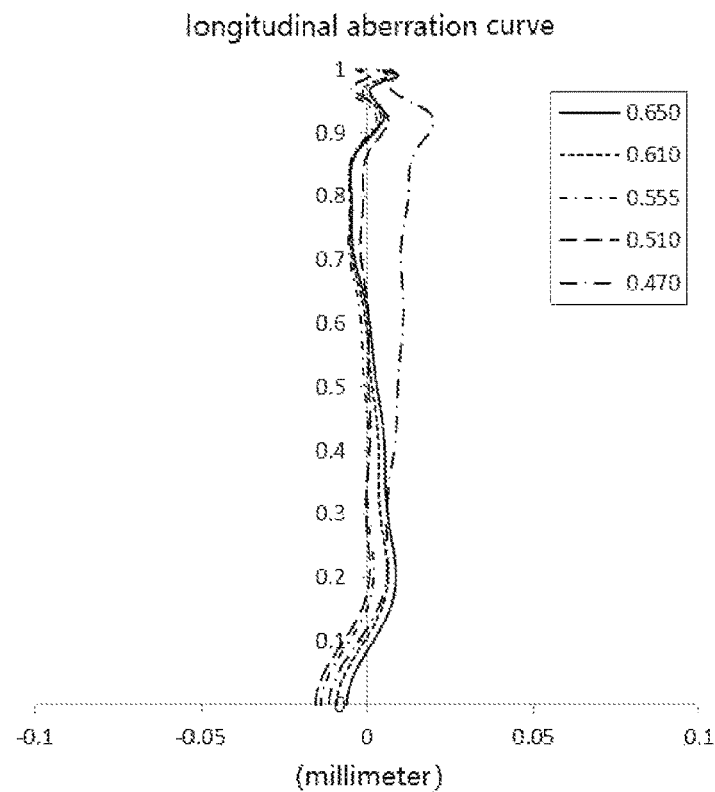
FIG. 8A to FIG. 8D show a longitudinal aberration curve, an astigmatism curve, a distortion curve and a lateral color curve of an optical imaging lens according to embodiment 4 respectively.
Figure 8B:
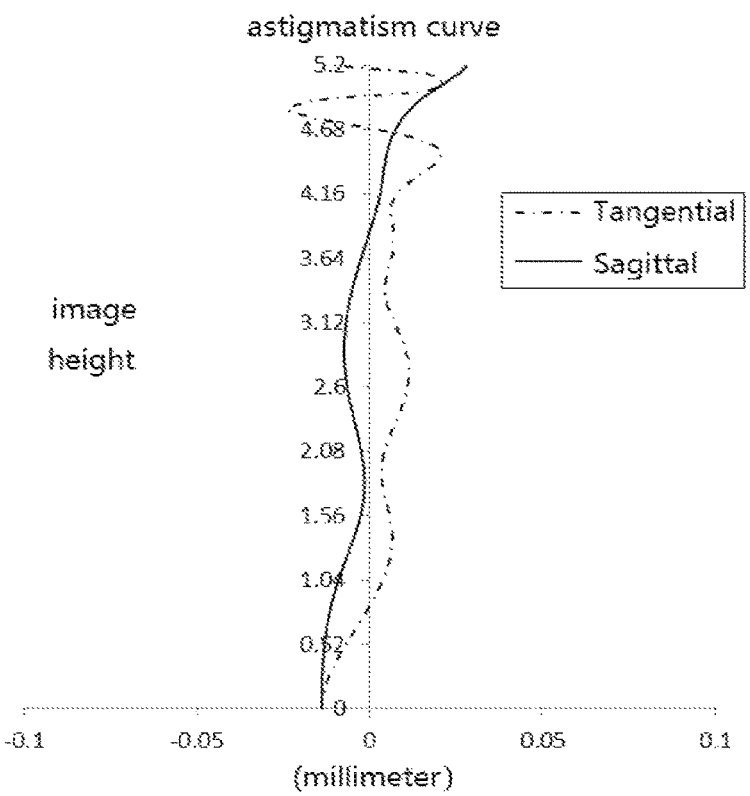
Figure 8C:
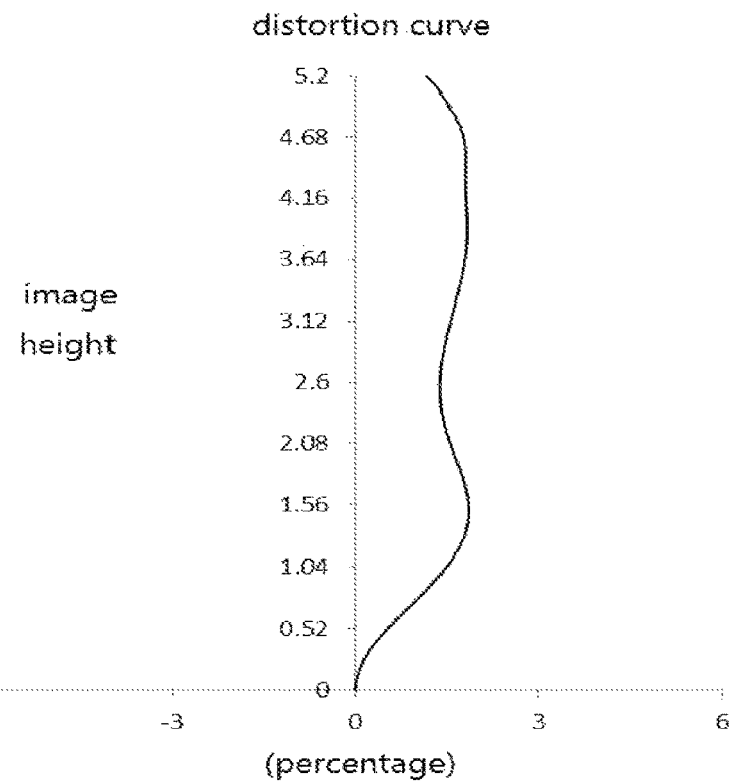
Figure 8D:
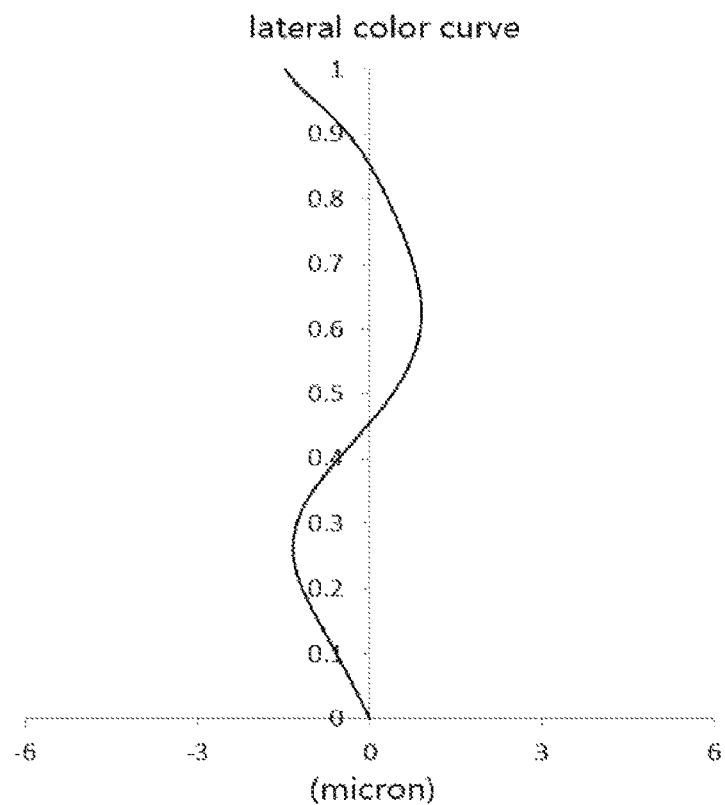

FIG. 8A shows a longitudinal aberration curve of the optical imaging lens according to embodiment 4 to represent deviation of a convergence focal point after light with different wavelengths passes through the lens. FIG. 8B shows an astigmatism curve of the optical imaging lens according to embodiment 4 to represent a meridian image surface curvature and a sagittal image surface curvature. FIG. 8C shows a distortion curve of the optical imaging lens according to embodiment 4 to represent distortion values corresponding to different image heights. FIG. 8D shows a lateral color curve of the optical imaging lens according to embodiment 4 to represent deviation of different image heights on the imaging surface after the light passes through the lens. According to FIG. 8A to FIG. 8D, it can be seen that the optical imaging lens provided in embodiment 4 may achieve high imaging quality.

Embodiment 5

Figure 9:
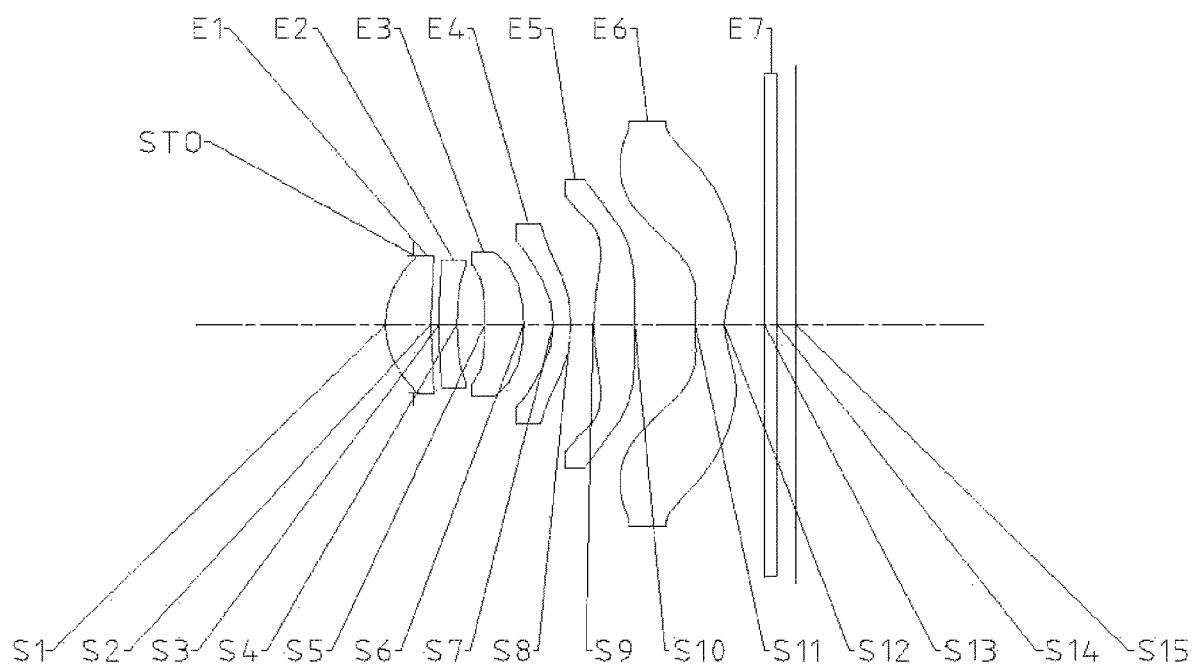
FIG. 9 shows a structure diagram of an optical imaging lens according to embodiment 5 of the disclosure.

An optical imaging lens according to embodiment 5 of the disclosure will be described below with reference to FIG. 9 to FIG. 10D. FIG. 9 shows a structure diagram of an optical imaging lens according to embodiment 5 of the disclosure.

As shown in FIG. 9, the optical imaging lens sequentially includes, from an object side to an image side along an optical axis, a diaphragm STO, a first lens E1, a second lens thereof is a convex surface, while an image-side surface S4 is a concave surface. The third lens E3 has positive refractive power, an object-side surface S5 thereof is a concave surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a convex surface, while an image-side surface S10 is a convex surface. The sixth lens E6 has negative refractive power, an object-side surface S11 thereof is a convex surface, while an image-side surface S12 is a concave surface. The optical filter E7 has an object-side surface S13 and an image-side surface S14. Light from an object sequentially penetrates through each of the surfaces S1 to S14 and is finally imaged on the imaging surface S15.

In the embodiment, a total effective focal length of the optical imaging lens is f=5.49 mm, TTL is a distance from the object-side surface S1 of the first lens E1 to the imaging surface S15 on the optical axis, TTL=6.52 mm, and ImgH is a half of a diagonal length of an effective pixel region on the imaging surface S15, ImgH=5.22 mm.

Table 9 is a basic parameter table of the optical imaging lens of embodiment 5, and units of the curvature radius, the thickness and the focal length are all millimeter (mm).

TABLE 9

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.4440 | | | | |
| S1 | Aspherical | 2.1217 | 0.7189 | 1.55 | 56.1 | 5.02 | 0.0000 |
| S2 | Aspherical | 8.2566 | 0.1343 | | | | 0.0000 |
| S3 | Aspherical | 13.1843 | 0.2800 | 1.68 | 19.2 | −13.41 | 0.0000 |
| S4 | Aspherical | 5.3321 | 0.4466 | | | | 0.0000 |
| S5 | Aspherical | −14.3476 | 0.6161 | 1.57 | 37.3 | 11.41 | 0.0000 |
| S6 | Aspherical | −4.5463 | 0.4673 | | | | 0.0000 |
| S7 | Aspherical | −2.2635 | 0.2800 | 1.67 | 20.4 | −9.60 | 0.0000 |
| S8 | Aspherical | −3.6788 | 0.3579 | | | | 0.0000 |
| S9 | Aspherical | 3.5405 | 0.6623 | 1.55 | 56.1 | 6.27 | 0.0000 |
| S10 | Aspherical | −94.6400 | 0.9605 | | | | 0.0000 |
| S11 | Aspherical | 6.2681 | 0.4638 | 1.55 | 56.1 | −4.65 | 0.0000 |

TABLE 9-continued

| Surface number | Surface type | Curvature radius | Thickness/ distance | Material Refractive index | Abbe number | Focal length | Conic coefficient |
|---|---|---|---|---|---|---|---|
| S12 | Aspherical | 1.7607 | 0.6307 | | | | −0.9377 |
| S13 | Spherical | Infinite | 0.2100 | 1.52 | 64.2 | | |
| S14 | Spherical | Infinite | 0.2919 | | | | |
| S15 | Spherical | Infinite | | | | | |

In embodiment 5, both the object-side surface and the image-side surface of any lens in the first lens E1 to the sixth lens E6 are aspherical surfaces. Table 10 shows high-order coefficients $A_4$, $A_6$, $A_8$, $A_{10}$, $A_{12}$, $A_{14}$, $A_{16}$, $A_{18}$ and $A_{20}$ applied to the aspherical mirror surfaces S1-S12 in embodiment 5.

TABLE 10

| Surface number | A4 | A6 | A8 | A10 | A12 | A14 | A16 | A18 | A20 |
|---|---|---|---|---|---|---|---|---|---|
| S1 | −7.2802E−04 | 3.2546E−02 | −1.5540E−01 | 4.8192E−01 | −9.8946E−01 | 1.3894E+00 | −1.3511E+00 | 9.0665E−01 | −4.1085E−01 |
| S2 | −3.6657E−02 | 1.0734E−01 | −5.7707E−01 | 2.1502E+00 | −5.2423E+00 | 8.6278E+00 | −9.7679E+00 | 7.6187E+00 | −4.0222E+00 |
| S3 | −5.4146E−02 | 6.3188E−02 | −1.4782E−01 | 5.3607E−01 | −1.3865E+00 | 2.4826E+00 | −3.1445E+00 | 2.8186E+00 | −1.7466E+00 |
| S4 | −2.3939E−02 | −8.6412E−03 | 3.0910E−01 | −1.5114E+00 | 4.8504E+00 | −1.0686E+01 | 1.6280E+01 | −1.7063E+01 | 1.2045E+01 |
| S5 | −5.4280E−02 | 8.9307E−02 | −7.5814E−01 | 3.4198E+00 | −1.0196E+01 | 2.0825E+01 | −2.9689E+01 | 2.9530E+01 | −2.0087E+01 |
| S6 | −3.8004E−02 | 2.6616E−02 | −2.5908E−01 | 9.4346E−01 | −2.1372E+00 | 3.2257E+00 | −3.3371E+00 | 2.3773E+00 | −1.1466E+00 |
| S7 | 1.9334E−02 | −6.1925E−02 | 7.3458E−02 | 2.2794E−02 | −1.4518E−01 | 1.7932E−01 | −1.2079E−01 | 4.9706E−02 | −1.2362E−02 |
| S8 | −1.5794E−02 | −7.5472E−02 | 1.5592E−01 | −1.5878E−01 | 1.0997E−01 | −5.6054E−02 | 2.1749E−02 | −6.3810E−03 | 1.3547E−03 |
| S9 | −2.7194E−02 | −5.1745E−02 | 7.1096E−02 | −5.7433E−02 | 3.1934E−02 | −1.2660E−02 | 3.5756E−03 | −7.1098E−04 | 9.6930E−05 |
| S10 | 1.7395E−02 | −4.4975E−02 | 3.2098E−02 | −1.5120E−02 | 4.8100E−03 | −9.2959E−04 | 6.1768E−05 | 1.6504E−05 | −4.8808E−06 |
| S11 | −1.6580E−01 | 3.5067E−02 | −7.1604E−04 | −1.4150E−03 | 4.5968E−04 | −8.4897E−05 | 1.0423E−05 | 8.7179E−07 | 4.9124E−08 |
| S12 | −1.7982E−01 | 7.0084E−02 | −2.2689E−02 | 5.6620E−03 | −1.0361E−03 | 1.3575E−04 | −1.2536E−05 | 7.9724E−07 | −3.3511E−08 |

Figure 10A:
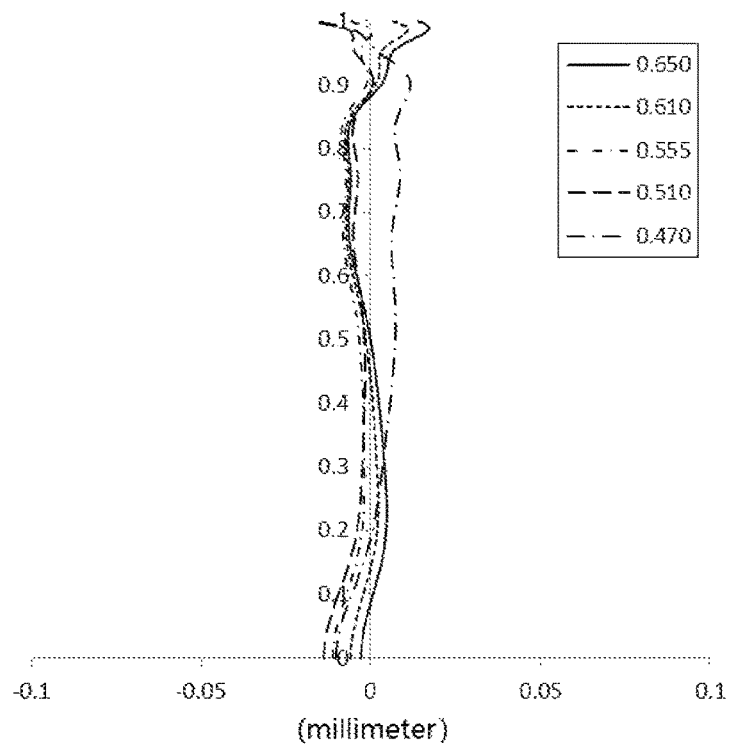
FIG. 10A to FIG. 10D show a longitudinal aberration curve, an astigmatism curve, a distortion curve and a lateral color curve of an optical imaging lens according to embodiment 5 respectively.
Figure 10B:
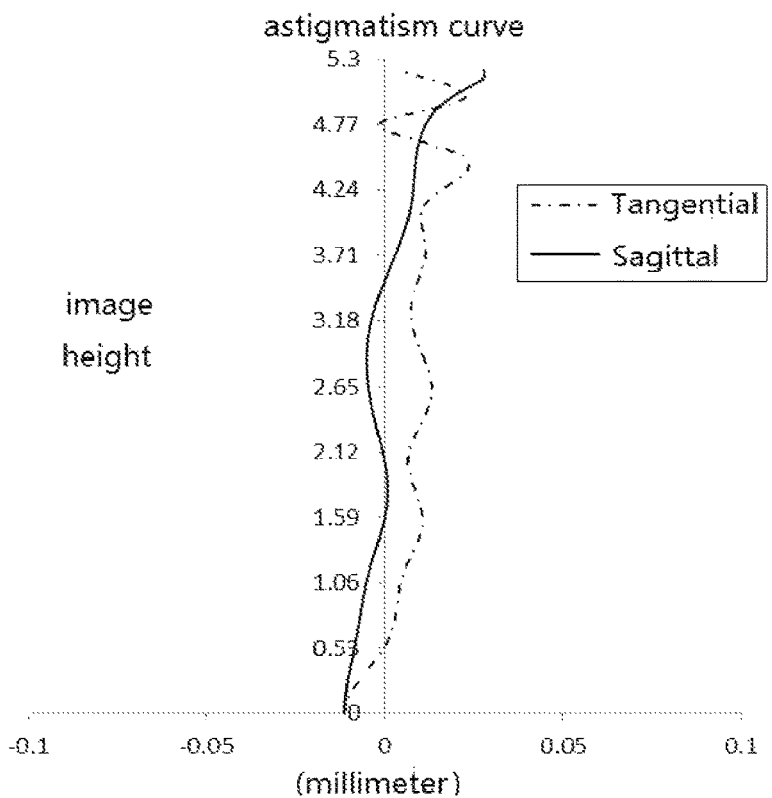
Figure 10C:
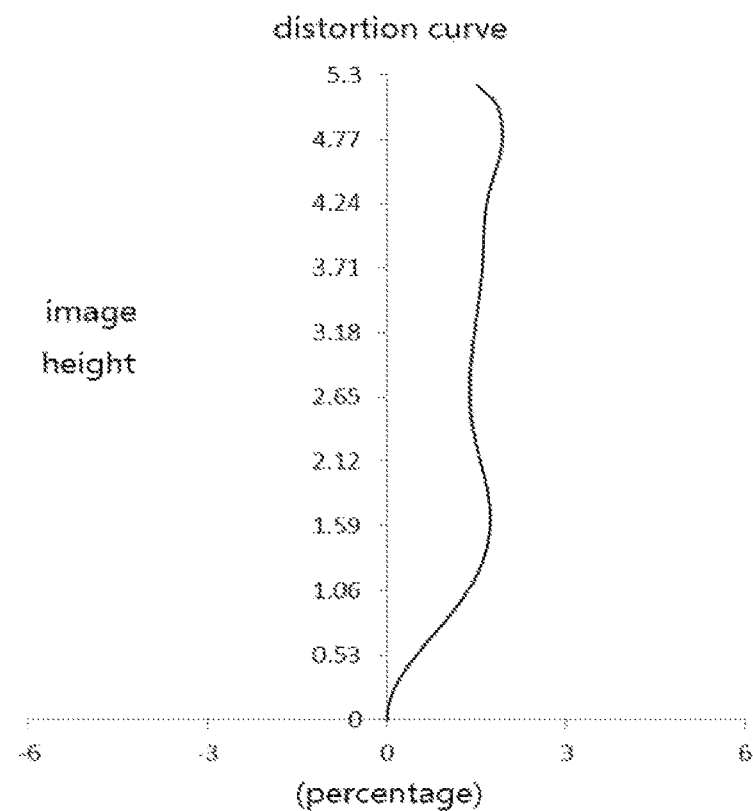
Figure 10D:
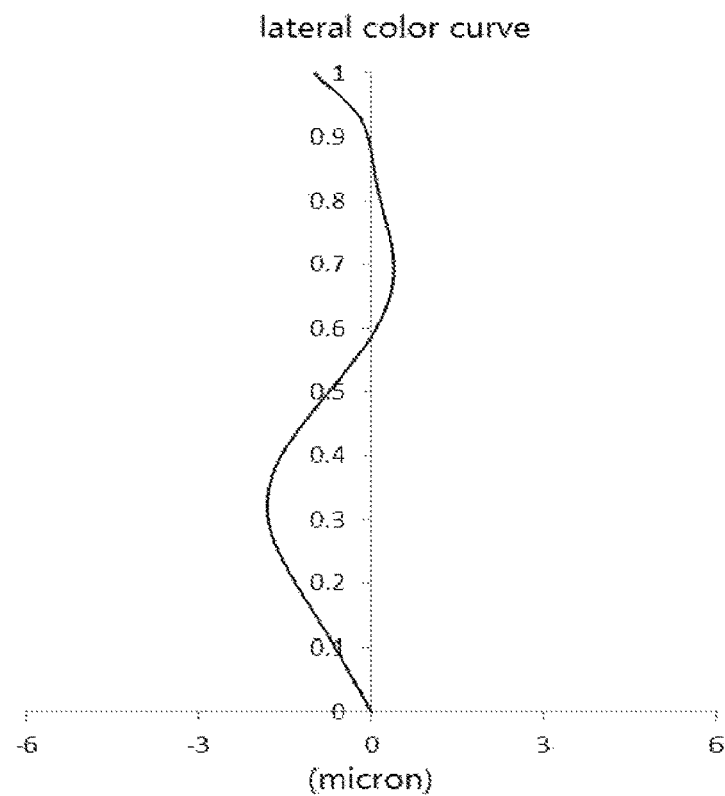

FIG. 10A shows a longitudinal aberration curve of the optical imaging lens according to embodiment 5 to represent deviation of a convergence focal point after light with different wavelengths passes through the lens. FIG. 10B shows an astigmatism curve of the optical imaging lens according to embodiment 5 to represent a meridian image surface curvature and a sagittal image surface curvature. FIG. 10C shows a distortion curve of the optical imaging lens according to embodiment 5 to represent distortion values corresponding to different image heights. FIG. 10D shows a lateral color curve of the optical imaging lens according to embodiment 5 to represent deviation of different image heights on the imaging surface after the light passes through the lens. According to FIG. 10A to FIG. 10D, it can be seen that the optical imaging lens provided in embodiment 5 may achieve high imaging quality.

Embodiment 6

Figure 11:
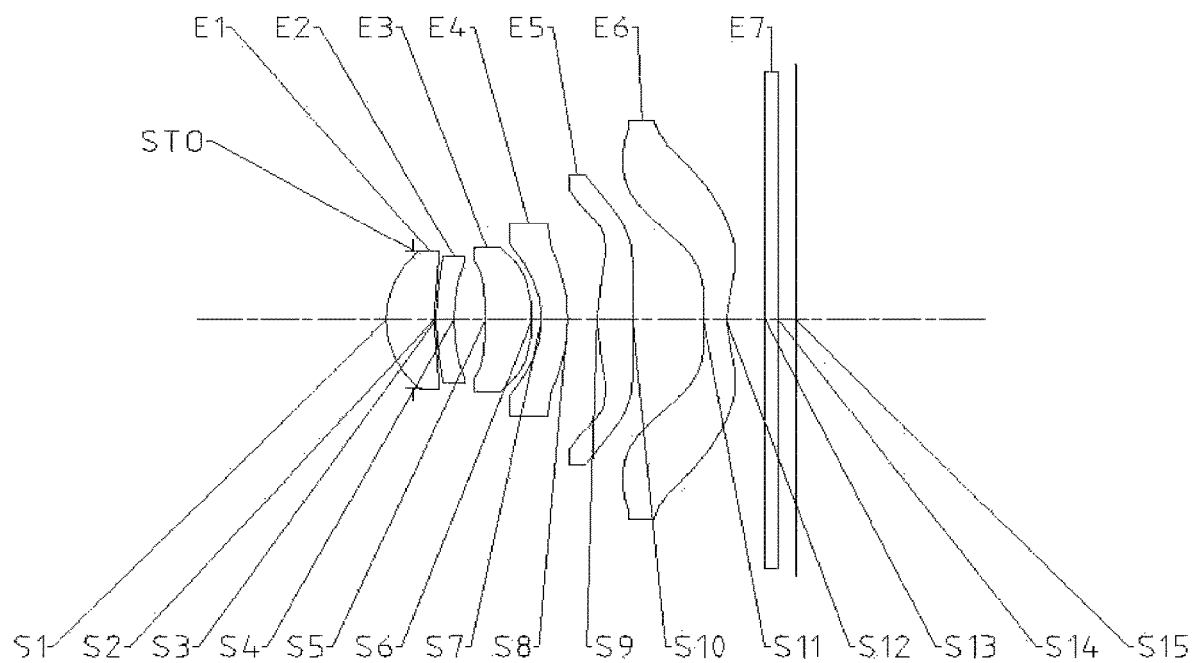
FIG. 11 shows a structure diagram of an optical imaging lens according to embodiment 6 of the disclosure.

An optical imaging lens according to embodiment 6 of the disclosure will be described below with reference to FIG. 11 to FIG. 12D. FIG. 11 shows a structure diagram of an optical imaging lens according to embodiment 6 of the disclosure.

As shown in FIG. 11, the optical imaging lens sequentially includes, from an object side to an image side along an optical axis, a diaphragm STO, a first lens E1, a second lens E2, a third lens E3, a fourth lens E4, a fifth lens E5, a sixth lens E6, an optical filter E7 and an imaging surface S15.

The first lens E1 has positive refractive power, an object-side surface S1 thereof is a convex surface, while an image-side surface S2 is a concave surface. The second lens E2 has positive refractive power, an object-side surface S3 thereof is a convex surface, while an image-side surface S4 is a concave surface. The third lens E3 has positive refractive power, an object-side surface S5 thereof is a concave surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a convex surface, while an image-side surface S10 is a convex surface. The sixth lens E6 has negative refractive power, an object-side surface S11 thereof is a convex surface, while an image-side surface S12 is a concave surface. The optical filter E7 has an object-side surface S13 and an image-side surface S14. Light from an object sequentially penetrates through each of the surfaces S1 to S14 and is finally imaged on the imaging surface S15.

In the embodiment, a total effective focal length of the optical imaging lens is f=5.47 mm, TTL is a distance from the object-side surface S1 of the first lens E1 to the imaging surface S15 on the optical axis, TTL=6.52 mm, and ImgH is a half of a diagonal length of an effective pixel region on the imaging surface S15, ImgH=5.13 mm.

Table 11 is a basic parameter table of the optical imaging lens of embodiment 6, and units of the curvature radius, the thickness and the focal length are all millimeter (mm).

TABLE 11

| Surface number | Surface type | Curvature radius | Thickness/ distance | Refractive index | Abbe number | Focal length | Conic efficient |
|---|---|---|---|---|---|---|---|
| OBJ | Spherical | Infinite | Infinite | | | | |
| STO | Spherical | Infinite | −0.4327 | | | | |
| S1 | Aspherical | 2.1442 | 0.7631 | 1.55 | 56.1 | 6.93 | 0.0000 |
| S2 | Aspherical | 4.3233 | 0.0300 | | | | 0.0000 |
| S3 | Aspherical | 3.6695 | 0.2800 | 1.68 | 19.2 | 92.60 | 0.0000 |
| S4 | Aspherical | 3.7773 | 0.5030 | | | | 0.0000 |
| S5 | Aspherical | −11.6579 | 0.7393 | 1.57 | 37.3 | 9.12 | 0.0000 |
| S6 | Aspherical | −3.6799 | 0.1523 | | | | 0.0000 |
| S7 | Aspherical | −2.4463 | 0.4165 | 1.67 | 20.4 | −8.13 | 0.0000 |
| S8 | Aspherical | −4.7679 | 0.4752 | | | | 0.0000 |
| S9 | Aspherical | 3.9558 | 0.5627 | 1.55 | 56.1 | 6.95 | 0.0000 |
| S10 | Aspherical | −88.8600 | 1.1267 | | | | 0.0000 |
| S11 | Aspherical | 8.1792 | 0.3600 | 1.55 | 56.1 | −4.46 | 0.0000 |
| S12 | Aspherical | 1.8477 | 0.6201 | | | | −0.9262 |
| S13 | Spherical | Infinite | 0.2100 | 1.52 | 64.2 | | |
| S14 | Spherical | Infinite | 0.2813 | | | | |
| S15 | Spherical | Infinite | | | | | |

In embodiment 6, both the object-side surface and the image-side surface of any lens in the first lens E1 to the sixth lens E6 are aspherical surfaces. Table 12 shows high-order coefficients $A_4$, $A_6$, $A_8$, $A_{10}$, $A_{12}$, $A_{14}$, $A_{16}$, $A_{18}$ and $A_{20}$ applied to the aspherical mirror surfaces S1-S12 in embodiment 6.

TABLE 12

| Surface number | A4 | A6 | A8 | A10 | A12 | A14 | A16 | A18 | A20 |
|---|---|---|---|---|---|---|---|---|---|
| S1 | −4.2513E−03 | 7.0559E−02 | −3.6023E−01 | 1.1842E+00 | −2.5676E+00 | 3.7876E+00 | −3.8540E+00 | 2.7014E+00 | −1.2790E+00 |
| S2 | −1.8105E−01 | 3.8596E−01 | −1.5339E+00 | 6.1088E+00 | −1.6851E+01 | 3.1464E+01 | −4.0299E+01 | 3.5445E+01 | −2.1029E+01 |
| S3 | −1.7421E−01 | 3.2445E−01 | −1.3748E+00 | 6.0196E+00 | −1.7757E+01 | 3.5075E+01 | −4.7356E+01 | 4.3851E+01 | −2.7375E+01 |
| S4 | −9.8933E−03 | −2.1318E−01 | 1.8214E+00 | −8.8537E+00 | 2.8410E+01 | −6.2086E+01 | 9.3631E+01 | −9.7332E+01 | 6.8428E+01 |
| S5 | −3.2459E−02 | 5.1324E−02 | −4.9510E−01 | 2.2254E+00 | −6.5082E+00 | 1.2828E+01 | −1.7433E+01 | 1.6370E+01 | −1.0441E+01 |
| S6 | −1.1209E−02 | −1.8981E−02 | −1.9319E−01 | 8.3615E−01 | −1.9039E+00 | 2.8228E+00 | −2.9124E+00 | 2.1117E+00 | −1.0509E+00 |
| S7 | 1.5591E−02 | −9.4749E−02 | 1.7066E−01 | −2.3806E−01 | 4.2008E−01 | −6.8608E−01 | 7.5570E−01 | −5.3054E−01 | 2.3705E−01 |
| S8 | −1.7814E−02 | −5.9072E−02 | 1.2294E−01 | −1.2507E−01 | 8.9818E−02 | −5.0858E−02 | 2.3675E−02 | −8.6798E−03 | 2.3033E−03 |
| S9 | −1.3798E−03 | −5.7989E−02 | 6.4083E−02 | −4.9467E−02 | 2.7658E−02 | −1.1241E−02 | 3.2710E−03 | −6.7046E−04 | 9.4333E−05 |
| S10 | 3.6450E−02 | −4.6867E−02 | 3.0730E−02 | −1.5998E−02 | 6.3702E−03 | −1.8336E−03 | 3.5494E−04 | −4.2211E−05 | 2.5342E−06 |
| S11 | −1.8248E−01 | 5.8332E−02 | −1.2604E−02 | 1.8361E−03 | −7.2528E−05 | −3.1142E−05 | 7.2505E−06 | −7.9574E−07 | 5.1977E−08 |
| S12 | −1.9537E−01 | 8.6247E−02 | −3.2331E−02 | 9.3237E−03 | −1.9776E−03 | 3.0305E−04 | −3.3127E−05 | 2.5362E−06 | −1.3190E−07 |

Figure 12A:
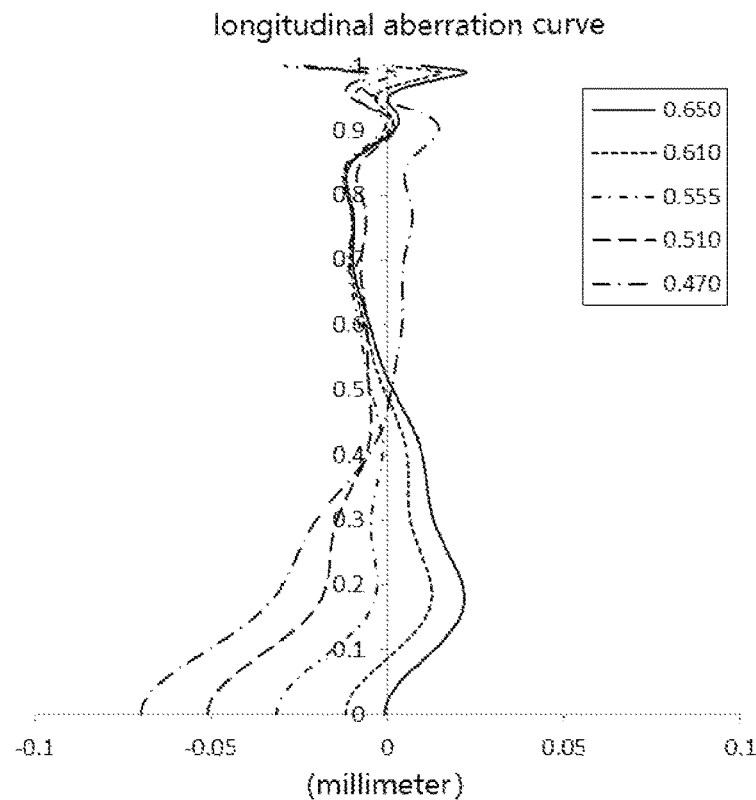
FIG. 12A to FIG. 12D show a longitudinal aberration curve, an astigmatism curve, a distortion curve and a lateral color curve of an optical imaging lens according to embodiment 6 respectively.
Figure 12B:
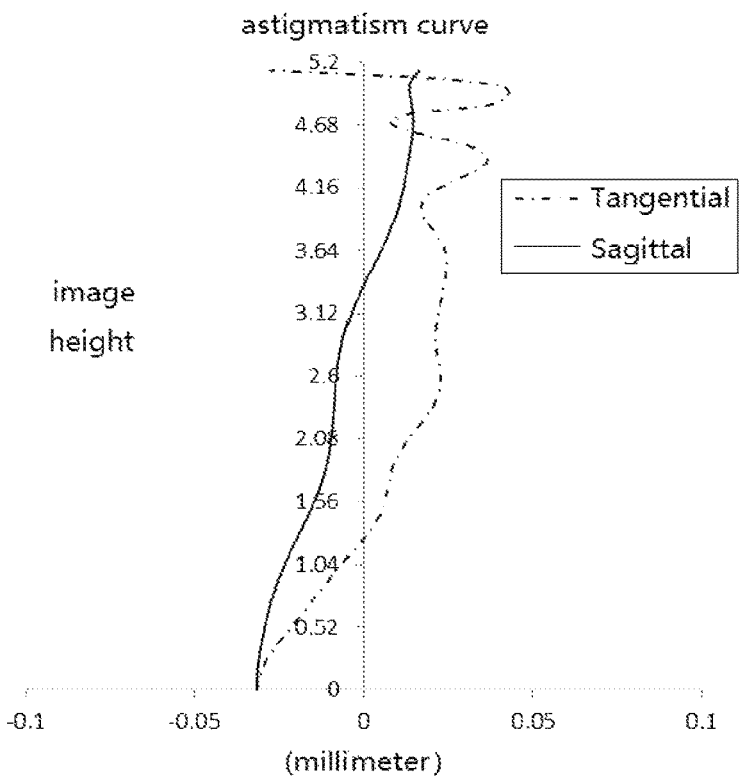
Figure 12C:
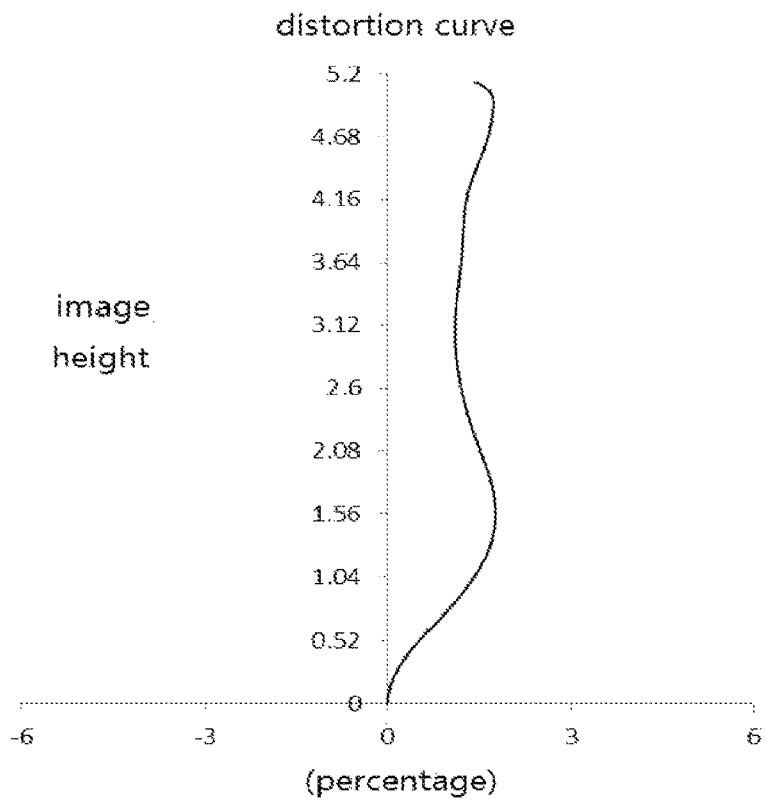
Figure 12D:
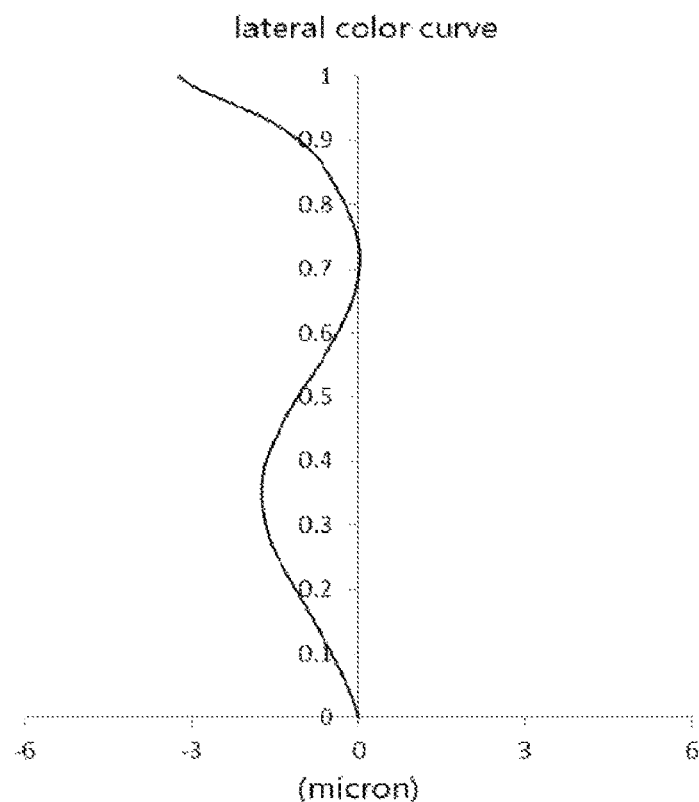

FIG. 12A shows a longitudinal aberration curve of the optical imaging lens according to embodiment 6 to represent deviation of a convergence focal point after light with different wavelengths passes through the lens. FIG. 12B shows an astigmatism curve of the optical imaging lens according to embodiment 6 to represent a meridian image surface curvature and a sagittal image surface curvature. FIG. 12C shows a distortion curve of the optical imaging lens according to embodiment 6 to represent distortion values corresponding to different image heights. FIG. 12D shows a lateral color curve of the optical imaging lens according to embodiment 6 to represent deviation of different image heights on the imaging surface after the light passes through the lens. According to FIG. 12A to FIG. 12D, it can be seen that the optical imaging lens provided in embodiment 6 may achieve high imaging quality.

Embodiment 7

Figure 13:
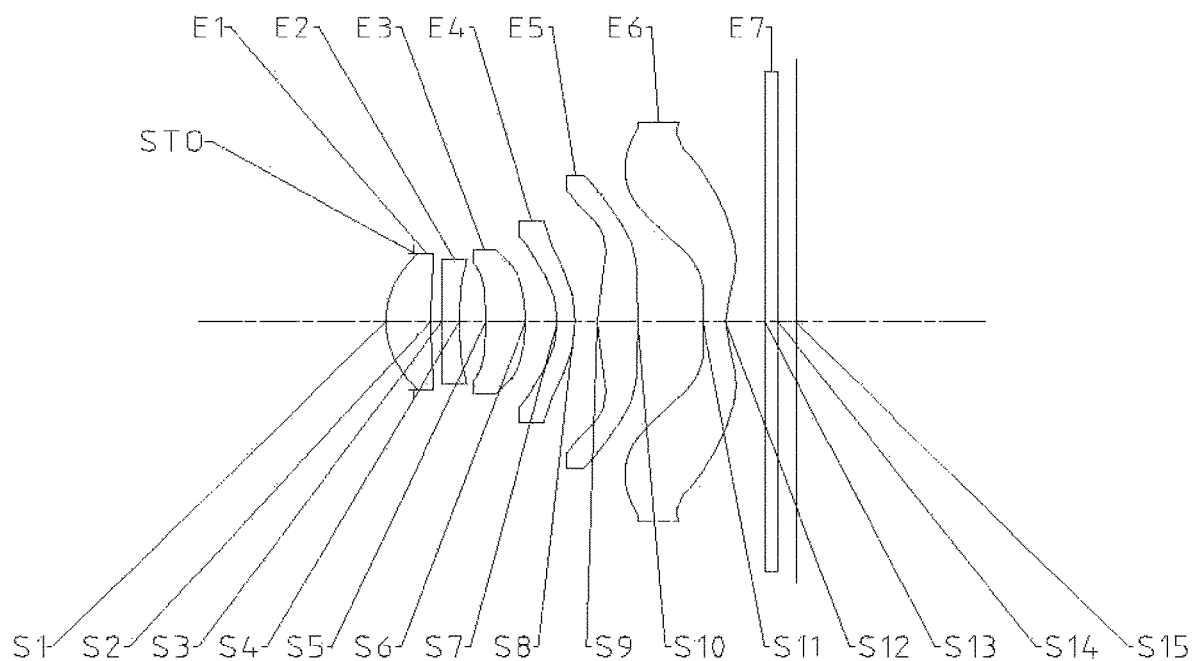
FIG. 13 shows a structure diagram of an optical imaging lens according to embodiment 7 of the disclosure.

An optical imaging lens according to embodiment 7 of the disclosure will be described below with reference to FIG. 13 to FIG. 14D. FIG. 13 shows a structure diagram of an optical imaging lens according to embodiment 7 of the disclosure.

As shown in FIG. 13, the optical imaging lens sequentially includes, from an object side to an image side along an optical axis, a diaphragm STO, a first lens E1, a second lens E2, a third lens E3, a fourth lens E4, a fifth lens E5, a sixth lens E6, an optical filter E7 and an imaging surface S15.

The first lens E1 has positive refractive power, an object-side surface S1 thereof is a convex surface, while an image-side surface S2 is a concave surface. The second lens E2 has negative refractive power, an object-side surface S3 thereof is a concave surface, while an image-side surface S4 is a concave surface. The third lens E3 has positive refractive power, an object-side surface S5 thereof is a concave surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a convex surface, while an image-side surface S10 is a convex surface. The sixth lens E6 has negative refractive power, an object-side surface S11 thereof is a convex surface, while an image-side surface S12 is a concave surface. The optical filter E7 has an object-side surface S13 and an image-side surface S14. Light from an object sequentially penetrates through each of the surfaces S1 to S14 and is finally imaged on the imaging surface S15.

In the embodiment, a total effective focal length of the optical imaging lens is f=5.49 mm, TTL is a distance from the object-side surface S1 of the first lens E1 to the imaging surface S15 on the optical axis, TTL=6.52 mm, and ImgH is a half of a diagonal length of an effective pixel region on the imaging surface S15, ImgH=5.25 mm.

Table 13 is a basic parameter table of the optical imaging lens of embodiment 7, and units of the curvature radius, the thickness and the focal length are all millimeter (mm).

it can be seen that the optical imaging lens provided in embodiment 7 may achieve high imaging quality.

Embodiment 8

An optical imaging lens according to embodiment 8 of the disclosure will be described below with reference to FIG. 15

TABLE 13

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.4503 | | | | |
| S1 | Aspherical | 2.1321 | 0.7145 | 1.55 | 56.1 | 4.89 | 0.0000 |
| S2 | Aspherical | 9.3511 | 0.1758 | | | | 0.0000 |
| S3 | Aspherical | −76.8600 | 0.2800 | 1.68 | 19.2 | −11.38 | 0.0000 |
| S4 | Aspherical | 8.5820 | 0.4168 | | | | 0.0000 |
| S5 | Aspherical | −20.7017 | 0.6325 | 1.57 | 37.3 | 10.96 | 0.0000 |
| S6 | Aspherical | −4.8544 | 0.5043 | | | | 0.0000 |
| S7 | Aspherical | −2.2828 | 0.2800 | 1.67 | 20.4 | −10.32 | 0.0000 |
| S8 | Aspherical | −3.5868 | 0.3621 | | | | 0.0000 |
| S9 | Aspherical | 3.5813 | 0.6425 | 1.55 | 56.1 | 6.16 | 0.0000 |
| S10 | Aspherical | −52.0451 | 1.0352 | | | | 0.0000 |
| S11 | Aspherical | 6.5644 | 0.3600 | 1.55 | 56.1 | −4.45 | 0.0000 |
| S12 | Aspherical | 1.7399 | 0.6228 | | | | −0.9243 |
| S13 | Spherical | Infinite | 0.2100 | 1.52 | 64.2 | | |
| S14 | Spherical | Infinite | 0.2840 | | | | |
| S15 | Spherical | Infinite | | | | | |

In embodiment 7, both the object-side surface and the image-side surface of any lens in the first lens E1 to the sixth lens E6 are aspherical surfaces. Table 14 shows high-order coefficients $A_4$, $A_6$, $A_8$, $A_{10}$, $A_{12}$, $A_{14}$, $A_{16}$, $A_{18}$ and $A_{20}$ applied to the aspherical mirror surfaces S1-S12 in embodiment 7.

TABLE 14

| Surface number | A4 | A6 | A8 | A10 | A12 | A14 | A16 | A18 | A20 |
|---|---|---|---|---|---|---|---|---|---|
| S1 | 2.3577E−03 | 1.9931E−03 | 7.1262E−04 | −1.1819E−02 | 4.4994E−02 | −1.0297E−01 | 1.5458E−01 | −1.5372E−01 | 9.9520E−02 |
| S2 | −1.5919E−02 | 2.3500E−03 | −2.6628E−03 | 7.4117E−02 | −3.2674E−01 | 7.4513E−01 | −1.0531E+00 | 9.6846E−01 | −5.8119E−01 |
| S3 | −2.9005E−02 | 3.1834E−02 | −3.5639E−02 | 1.7866E−01 | −6.1583E−01 | 1.3289E+00 | −1.9164E+00 | 1.8857E+00 | −1.2501E+00 |
| S4 | −1.7302E−02 | 5.1442E−02 | −1.2486E−01 | 3.3273E−01 | −4.1320E−01 | −2.4097E−01 | 1.6815E+00 | −2.7464E+00 | 2.4116E+00 |
| S5 | −5.9326E−02 | 8.3676E−02 | −6.8280E−01 | 2.9964E+00 | −8.7497E+00 | 1.7545E+01 | −2.4616E+01 | 2.4155E+01 | −1.6249E+01 |
| S6 | −3.7530E−02 | 1.2414E−03 | −1.3371E−01 | 5.7648E−01 | −1.4262E+00 | 2.2675E+00 | −2.4207E+00 | 1.7560E+00 | −8.5443E−01 |
| S7 | 2.1649E−02 | −8.0086E−02 | 1.3912E−01 | −1.0669E−01 | 1.6834E−02 | 4.3234E−02 | −4.2957E−02 | 1.9855E−02 | −5.0919E−03 |
| S8 | −1.0675E−02 | −9.2750E−02 | 1.9195E−01 | −2.0550E−01 | 1.4989E−01 | −7.9272E−02 | 3.1045E−02 | −8.9365E−03 | 1.8264E−03 |
| S9 | −1.5580E−02 | −6.6997E−02 | 8.2896E−02 | −6.3379E−02 | 3.3776E−02 | −1.2972E−02 | 3.5960E−03 | −7.1075E−04 | 9.7310E−05 |
| S10 | 3.3609E−02 | −5.9981E−02 | 4.0295E−02 | −1.7848E−02 | 5.1474E−03 | −8.2353E−04 | 8.4434E−06 | 2.6544E−05 | −5.8467E−06 |
| S11 | −1.7839E−01 | 3.9778E−02 | −1.7093E−03 | −1.1807E−03 | 4.0039E−04 | −7.3691E−05 | 8.9997E−06 | −7.5118E−07 | 4.2360E−08 |
| S12 | −1.9515E−01 | 7.7240E−02 | −2.5145E−02 | 6.3090E−03 | −1.1532E−03 | 1.4940E−04 | −1.3485E−05 | 8.2640E−07 | −3.2702E−08 |

Figure 14A:
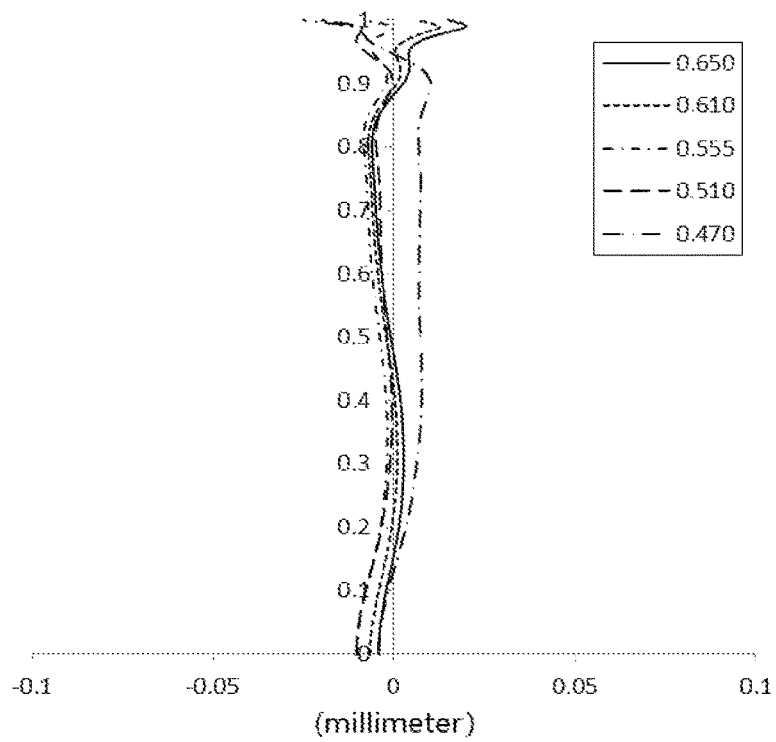
FIG. 14A to FIG. 14D show a longitudinal aberration curve, an astigmatism curve, a distortion curve and a lateral color curve of an optical imaging lens according to embodiment 7 respectively.
Figure 14B:
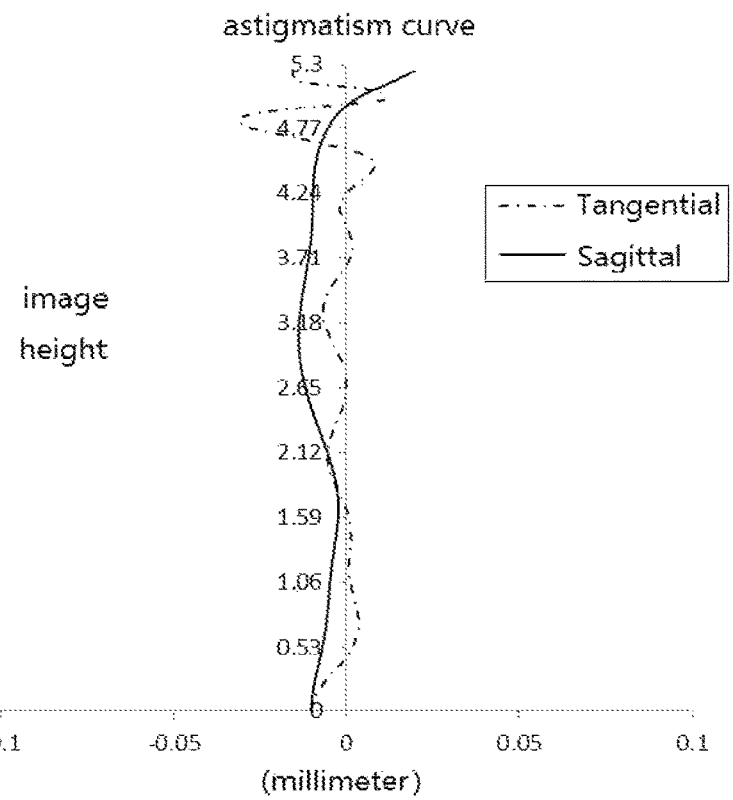
Figure 14C:
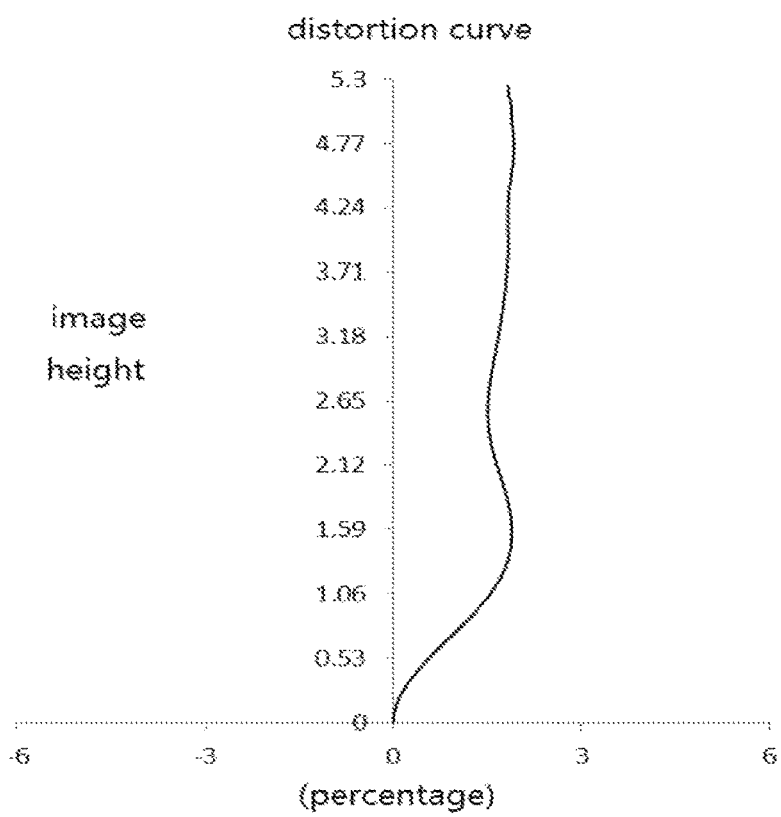
Figure 14D:
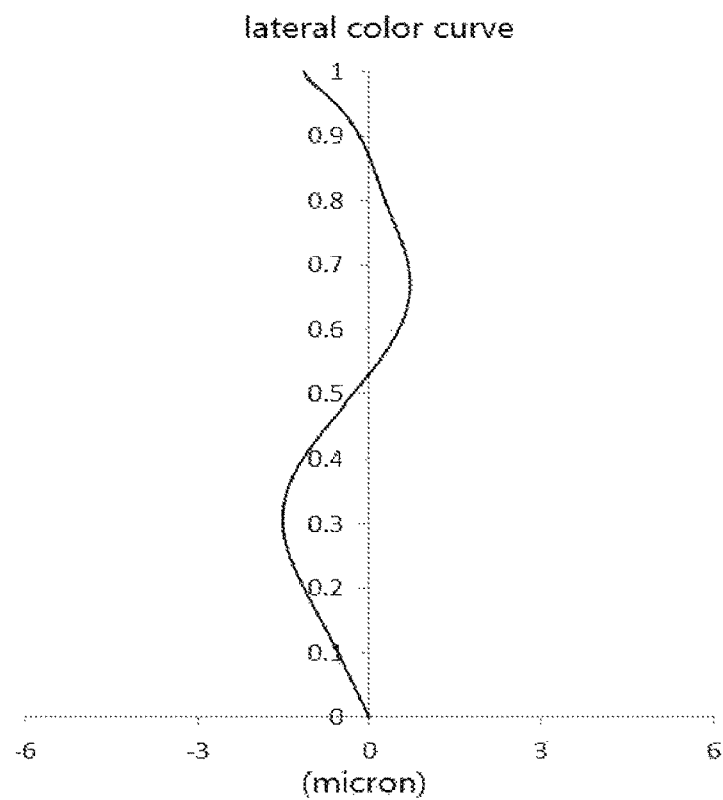

FIG. 14A shows a longitudinal aberration curve of the optical imaging lens according to embodiment 7 to represent deviation of a convergence focal point after light with different wavelengths passes through the lens. FIG. 14B shows an astigmatism curve of the optical imaging lens according to embodiment 7 to represent a meridian image surface curvature and a sagittal image surface curvature. FIG. 14C shows a distortion curve of the optical imaging lens according to embodiment 7 to represent distortion values corresponding to different image heights. FIG. 14D shows a lateral color curve of the optical imaging lens according to embodiment 7 to represent deviation of different image heights on the imaging surface after the light passes through the lens. According to FIG. 14A to FIG. 14D, to FIG. 16D. FIG. 15 shows a structure diagram of an optical imaging lens according to embodiment 8 of the disclosure.

Figure 15:
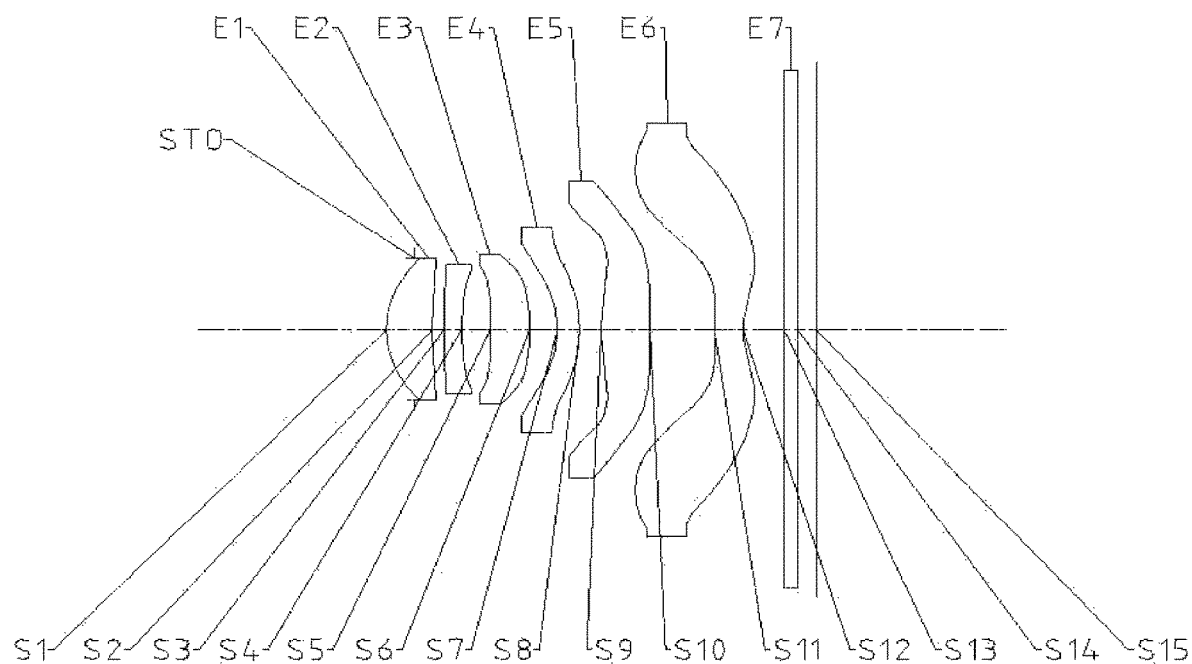
FIG. 15 shows a structure diagram of an optical imaging lens according to embodiment 8 of the disclosure.

As shown in FIG. 15, the optical imaging lens sequentially includes, from an object side to an image side along an optical axis, a diaphragm STO, a first lens E1, a second lens E2, a third lens E3, a fourth lens E4, a fifth lens E5, a sixth lens E6, an optical filter E7 and an imaging surface S15.

The first lens E1 has positive refractive power, an object-side surface S1 thereof is a convex surface, while an image-side surface S2 is a concave surface. The second lens E2 has negative refractive power, an object-side surface S3 thereof is a convex surface, while an image-side surface S4 is a concave surface. The third lens E3 has positive refractive power, an object-side surface S5 thereof is a convex surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a convex surface, while an image-side surface S10 is a convex surface. The sixth lens E6 has negative refractive power, an object-side surface S11 thereof is a convex surface, while an image-side surface S12 is a concave surface. The optical filter E7 has an object-side surface S13 and an image-side surface S14. Light from an object sequentially penetrates through each of the surfaces S1 to S14 and is finally imaged on the imaging surface S15.

In the embodiment, a total effective focal length of the optical imaging lens is f=5.76 mm, TTL is a distance from the object-side surface S1 of the first lens E1 to the imaging surface S15 on the optical axis, TTL=6.84 mm, and ImgH is a half of a diagonal length of an effective pixel region on the imaging surface S15, ImgH=5.50 mm.

Table 15 is a basic parameter table of the optical imaging lens of embodiment 8, and units of the curvature radius, the thickness and the focal length are all millimeter (mm).

TABLE 15

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.4415 | | | | |
| S1 | Aspherical | 2.2345 | 0.7285 | 1.55 | 56.1 | 5.32 | 0.0000 |
| S2 | Aspherical | 8.5828 | 0.1870 | | | | 0.0000 |
| S3 | Aspherical | 16.1347 | 0.2829 | 1.68 | 19.2 | −12.80 | 0.0000 |
| S4 | Aspherical | 5.6021 | 0.4509 | | | | 0.0000 |
| S5 | Aspherical | 98.4800 | 0.6304 | 1.57 | 37.3 | 10.60 | 0.0000 |
| S6 | Aspherical | −6.4271 | 0.4402 | | | | 0.0000 |
| S7 | Aspherical | −2.4032 | 0.3513 | 1.67 | 20.4 | −9.77 | 0.0000 |
| S8 | Aspherical | −4.0352 | 0.3429 | | | | 0.0000 |
| S9 | Aspherical | 3.8195 | 0.7823 | 1.55 | 56.1 | 6.62 | 0.0000 |
| S10 | Aspherical | −61.5469 | 1.0213 | | | | 0.0000 |
| S11 | Aspherical | 6.7604 | 0.4544 | 1.55 | 56.1 | −4.88 | 0.0000 |
| S12 | Aspherical | 1.8644 | 0.6569 | | | | −0.9285 |
| S13 | Spherical | Infinite | 0.2100 | 1.52 | 64.2 | | |
| S14 | Spherical | Infinite | 0.3012 | | | | |
| S15 | Spherical | Infinite | | | | | |

In embodiment 8, both the object-side surface and the image-side surface of any lens in the first lens E1 to the sixth lens E6 are aspherical surfaces. Table 16 shows high-order coefficients $A_4$, $A_6$, $A_8$, $A_{10}$, $A_{12}$, $A_{14}$, $A_{16}$, $A_{18}$ and $A_{20}$ applied to the aspherical mirror surfaces S1-S12 in embodiment 8.

TABLE 16

| Surface number | A4 | A6 | A8 | A10 | A12 | A14 | A16 | A18 | A20 |
|---|---|---|---|---|---|---|---|---|---|
| S1 | 7.3142E−04 | 8.3264E−03 | −2.6790E−02 | 5.9074E−02 | −8.1667E−02 | 6.3416E−02 | −1.1290E−02 | −2.8364E−02 | 3.0499E−02 |
| S2 | −2.2769E−02 | 4.9889E−02 | −2.4518E−01 | 8.4215E−01 | −1.8823E+00 | 2.8215E+00 | −2.8909E+00 | 2.0274E+00 | −9.5612E−01 |
| S3 | −4.5279E−02 | 5.7336E−02 | −1.6875E−01 | 6.1345E−01 | −1.4981E+00 | 2.4463E+00 | −2.7283E+00 | 2.0868E+00 | −1.0771E+00 |
| S4 | −2.8107E−02 | 3.6107E−02 | −4.0364E−02 | 8.8126E−02 | −5.8939E−02 | −2.4956E−01 | 7.7808E−01 | −1.0766E+00 | 8.6444E−01 |
| S5 | −4.2092E−02 | 4.8510E−02 | −3.3707E−01 | 1.1765E+00 | −2.7162E+00 | 4.2945E+00 | −4.7606E+00 | 3.7128E+00 | −2.0034E+00 |
| S6 | −2.9743E−02 | 8.3397E−03 | −1.3874E−01 | 4.6519E−01 | −9.5976E−01 | 1.3144E+00 | −1.2327E+00 | 7.9618E−01 | −3.4812E−01 |
| S7 | 2.2753E−02 | −7.3934E−02 | 1.3335E−01 | −1.5812E−01 | 1.5036E−01 | −1.2001E−01 | 7.6995E−02 | −3.6129E−02 | 1.1497E−02 |
| S8 | −1.4142E−02 | −6.7382E−02 | 1.3499E−01 | −1.4240E−01 | 1.0572E−01 | −5.8293E−02 | 2.4069E−02 | −7.2796E−03 | 1.5453E−03 |
| S9 | −2.9569E−02 | −4.3864E−02 | 6.1790E−02 | −5.1482E−02 | 3.0000E−02 | −1.2661E−02 | 3.8539E−03 | −8.3272E−04 | 1.2378E−04 |
| S10 | 1.3462E−02 | −3.3490E−02 | 2.0789E−02 | −8.1329E−03 | 1.9216E−03 | −1.5796E−04 | −5.6660E−05 | 2.2499E−05 | −3.7575E−06 |
| S11 | −1.4651E−01 | 2.9080E−02 | −1.1638E−03 | −6.5999E−04 | 2.0009E−04 | −3.2641E−05 | 3.5210E−06 | −2.5901E−07 | 1.2854E−08 |
| S12 | −1.5846E−01 | 5.6062E−02 | −1.6493E−02 | 3.7339E−03 | −6.1693E−04 | 7.2438E−05 | −5.9261E−06 | 3.2767E−07 | −1.1558E−08 |

Figure 16A:
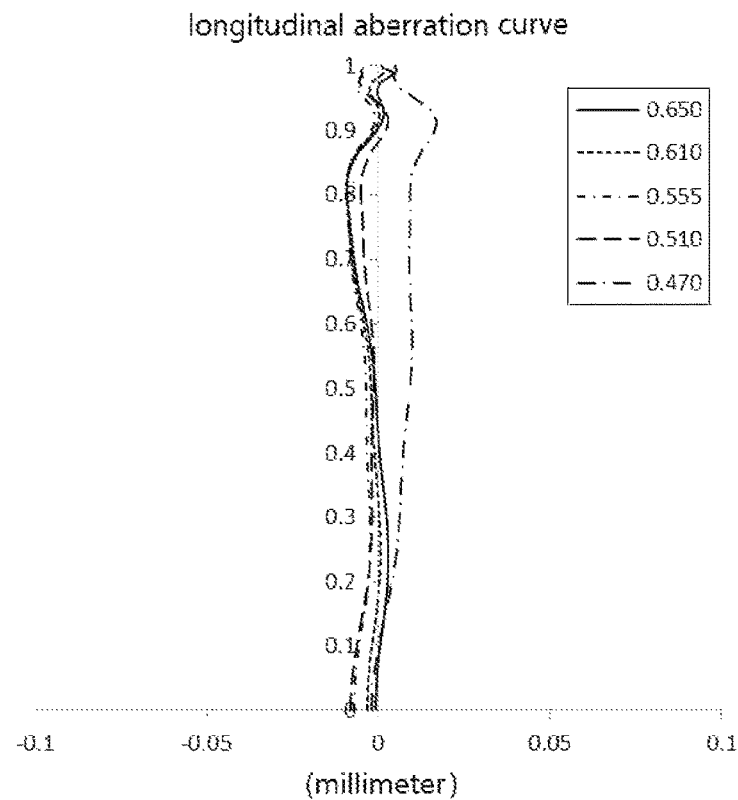
FIG. 16A to FIG. 16D show a longitudinal aberration curve, an astigmatism curve, a distortion curve and a lateral color curve of an optical imaging lens according to embodiment 8 respectively.
Figure 16B:
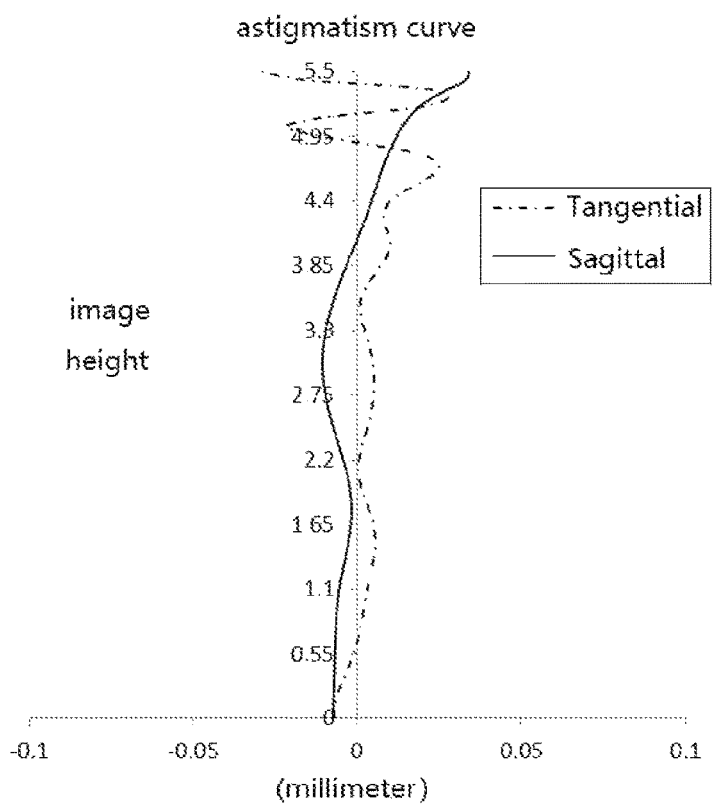
Figure 16C:
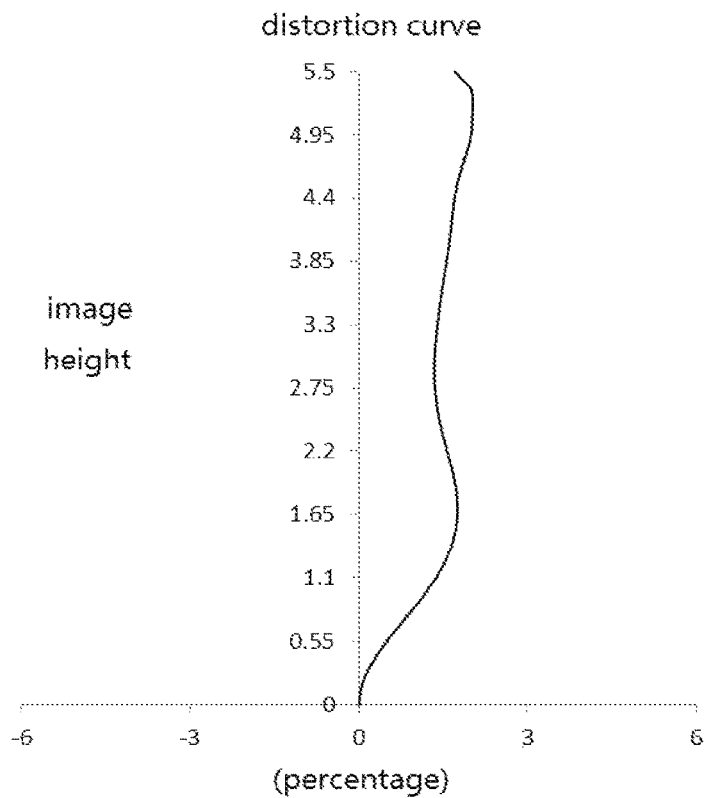
Figure 16D:
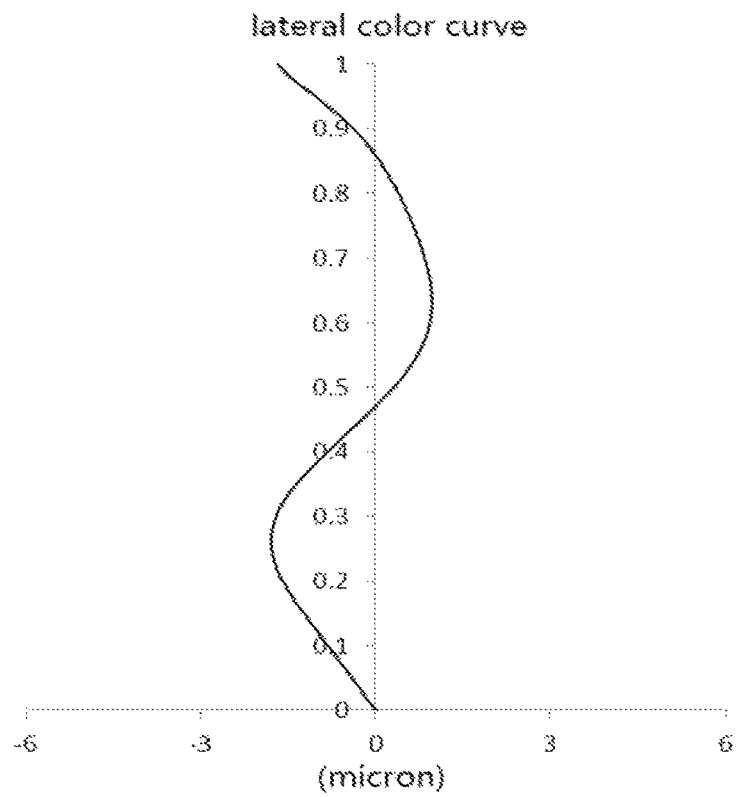

FIG. 16A shows a longitudinal aberration curve of the optical imaging lens according to embodiment 8 to represent deviation of a convergence focal point after light with different wavelengths passes through the lens. FIG. 16B shows an astigmatism curve of the optical imaging lens according to embodiment 8 to represent a meridian image surface curvature and a sagittal image surface curvature. FIG. 16C shows a distortion curve of the optical imaging lens according to embodiment 8 to represent distortion values corresponding to different image heights. FIG. 16D shows a lateral color curve of the optical imaging lens according to embodiment 8 to represent deviation of different image heights on the imaging surface after the light passes through the lens. According to FIG. 16A to FIG. 16D, it can be seen that the optical imaging lens provided in embodiment 8 may achieve high imaging quality.

From the above, embodiment 1 to embodiment 8 meet a relationship shown in Table 17 respectively.

TABLE 17

| Conditional expression/embodiment | 1 | 2 | 3 | 4 | 5 | 6 | 7 | 8 |
|---|---|---|---|---|---|---|---|---|
| ImgH/(TTL/ImgH) (mm) | 4.28 | 4.08 | 4.21 | 4.15 | 4.17 | 4.04 | 4.23 | 4.43 |
| TTL/ImgH | 1.23 | 1.26 | 1.24 | 1.25 | 1.25 | 1.27 | 1.24 | 1.24 |
| f × tan(Semi-FOV) (mm) | 5.20 | 5.05 | 5.13 | 5.12 | 5.12 | 5.01 | 5.14 | 5.40 |
| f1/f5 | 0.81 | 1.06 | 0.73 | 0.72 | 0.80 | 1.00 | 0.79 | 0.80 |
| (f6 − f4)/f | 0.67 | 0.76 | 1.61 | 1.16 | 0.90 | 0.67 | 1.07 | 0.85 |
| R7/R8 | 0.57 | 0.50 | 0.59 | 0.55 | 0.62 | 0.51 | 0.64 | 0.60 |
| (CT5 + CT6)/T56 | 1.38 | 0.79 | 0.88 | 0.94 | 1.17 | 0.82 | 0.97 | 1.21 |
| f3/R6 | −1.83 | −2.68 | −2.33 | −1.61 | −2.51 | −2.48 | −2.26 | −1.65 |
| DT62/(DT11 + DT12) | 1.45 | 1.41 | 1.44 | 1.45 | 1.51 | 1.50 | 1.49 | 1.49 |
| CT5/ET5 | 1.86 | 1.93 | 1.68 | 1.93 | 2.14 | 2.13 | 2.35 | 1.98 |
| (SAG41 + SAG42)/(SAG51 + SAG52) | 0.88 | 0.71 | 0.78 | 0.55 | 0.86 | 0.69 | 0.81 | 0.71 |
| SAG62/SAG32 | 3.30 | 2.51 | 2.59 | 2.77 | 1.97 | 2.21 | 1.54 | 1.89 |
| f123/f | 0.89 | 0.84 | 0.97 | 0.90 | 0.92 | 0.80 | 0.93 | 0.90 |

The above description is only description about the preferred embodiments of the disclosure and adopted technical principles. It is understood by those skilled in the art that the scope of disclosure involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens, sequentially comprising, from an object side to an image side along an optical axis:
   a first lens having positive refractive power;
   a second lens having refractive power;
   a third lens having refractive power;
   a fourth lens having negative refractive power, wherein an object-side surface thereof is a concave surface, while an image-side surface is a convex surface;
   a fifth lens having positive refractive power; and
   a sixth lens having negative refractive power, wherein an object-side surface thereof is a convex surface; and
   TTL is a distance from an object-side surface of the first lens to an imaging surface of the optical imaging lens on the optical axis, ImgH is a half of a diagonal length of an effective pixel region on the imaging surface of the optical imaging lens, TTL and ImgH meet:

$4.0 \text{ mm} < \text{Img}H/(\text{TTL}/\text{Img}H) < 7.0 \text{ mm}$;

an effective focal length f4 of the fourth lens, an effective focal length f6 of the sixth lens and a total effective focal length f of the optical imaging lens meet:

$0.6 < (f6-f4)/f < 2.0$;

an effective focal length f1 of the first lens and an effective focal length f5 of the fifth lens meet:

$0.7 < f1/f5 < 1.2$;

a curvature radius R7 of the object-side surface of the fourth lens and a curvature radius R8 of the image-side surface of the fourth lens meet:

$0.4 < R7/R8 < 0.7$;

a maximum effective radius DT11 of the object-side surface of the first lens, a maximum effective radius DT12 of an image-side surface of the first lens and a maximum effective radius DT62 of an image-side surface of the sixth lens meet:

$1.3 < DT62/(DT11+DT12) < 1.7$;

a combined focal length f123 of the first lens, the second lens and the third lens and a total effective focal length f of the optical imaging lens meet:

$0.7 < f123/f < 1.0$;

$1.5 < \text{SAG62}/\text{SAG32} < 3.4$, wherein SAG32 is an on-axis distance from an intersection point of an image-side surface of the third lens and the optical axis to an effective radius vertex of the image-side surface of the third lens, and SAG62 is an on-axis distance from an intersection point of an image-side surface of the sixth lens and the optical axis to an effective radius vertex of the image-side surface of the sixth lens.

2. The optical imaging lens as claimed in claim 1, wherein TTL and ImgH meet:

$\text{TTL}/\text{Img}H < 1.3$.

3. The optical imaging lens as claimed in claim 1, wherein a total effective focal length f of the optical imaging lens and a maximum semi-field of view (Semi-FOV) of the optical imaging lens meet:

$5.0 \text{ mm} \leq f \times \tan(\text{Semi-FOV}) < 7.0 \text{ mm}$.

4. The optical imaging lens as claimed in claim 1, wherein a center thickness CT5 of the fifth lens on the optical axis, a center thickness CT6 of the sixth lens on the optical axis and an air space T56 of the fifth lens and the sixth lens on the optical axis meet:

$0.7 < (CT5+CT6)/T56 < 1.5.$

5. The optical imaging lens as claimed in claim 1, wherein an effective focal length f3 of the third lens and a curvature radius R6 of an image-side surface of the third lens meet:

$-2.7 < f3/R6 < -1.6.$

6. The optical imaging lens as claimed in claim 1, wherein the center thickness CT5 of the fifth lens on the optical axis and an edge thickness ET5 of the fifth lens meet:

$1.6 < CT5/ET5 < 2.4.$

7. The optical imaging lens as claimed in claim 1, wherein $0.5 < (SAG41+SAG42)/(SAG51+SAG52) < 0.9,$ wherein SAG41 is an on-axis distance from an intersection point of the object-side surface of the fourth lens and the optical axis to an effective radius vertex of the object-side surface of the fourth lens, SAG42 is an on-axis distance from an intersection point of the image-side surface of the fourth lens and the optical axis to an effective radius vertex of the image-side surface of the fourth lens, SAG51 is an on-axis distance from an intersection point of an object-side surface of the fifth lens and the optical axis to an effective radius vertex of the object-side surface of the fifth lens, and SAG52 is an on-axis distance from an intersection point of an image-side surface of the fifth lens and the optical axis to an effective radius vertex of the image-side surface of the fifth lens.

* * * * *